United States Patent
Goos et al.

(10) Patent No.: US 11,651,000 B2
(45) Date of Patent: May 16, 2023

(54) SYSTEM AND METHOD FOR FILTERING A DATA SET AND/OR SELECTING AT LEAST ONE ITEM OF THE DATA SET

(71) Applicant: Katholieke Universiteit Leuven, Leuven (BE)

(72) Inventors: Peter Philiep Goos, Heverlee (BE); Bart De Ketelaere, Boechout (BE); José Núñez Ares, Leuven (BE)

(73) Assignee: Katholieke Universiteit Leuven, Leuven (BE)

( * ) Notice: Subject to any disclaimer, the term of this patent is extended or adjusted under 35 U.S.C. 154(b) by 0 days.

(21) Appl. No.: 17/953,404

(22) Filed: Sep. 27, 2022

(65) Prior Publication Data

US 2023/0106165 A1 Apr. 6, 2023

Related U.S. Application Data

(60) Provisional application No. 63/248,564, filed on Sep. 27, 2021.

(30) Foreign Application Priority Data

Sep. 27, 2021 (EP) .................................. 21199095

(51) Int. Cl.
   *G06F 16/26* (2019.01)
   *G06F 16/2457* (2019.01)
   *G06F 16/248* (2019.01)

(52) U.S. Cl.
   CPC ...... *G06F 16/24578* (2019.01); *G06F 16/248* (2019.01); *G06F 16/26* (2019.01)

(58) Field of Classification Search
   CPC ... G06F 16/24578; G06F 16/26; G06F 16/248
   (Continued)

(56) References Cited

U.S. PATENT DOCUMENTS 6,629,097 B1 * 9/2003 Keith .................... G06F 16/285
                                                            715/848
8,090,712 B2 * 1/2012 Shellshear .............. G06F 16/54
                                                            707/723
(Continued)

OTHER PUBLICATIONS

Astorga-Vargas Maria Angelica et al: "Design of Experiments Applied to a Software Engineering Project Based on Knowledge Processes", 2018 6th International Conference in Software Engineering Research and Innovation (Conisoft), IEEE, Oct. 24, 2018 (Oct. 24, 2018), pp. 59-65, XP033520579, DOI: 10.1109/CONISOFT. 2018.8645897 [retrieved on Feb. 20, 2019].

*Primary Examiner* — Hanh B Thai
(74) *Attorney, Agent, or Firm* — N.V. Nederlandsch Octrooibureau

(57) ABSTRACT

A computer-implemented method of generating a visual representation of items comprising selecting a pair of items m and n comprising parameters representing a property, selecting a pair of parameters p and q, being $a_{mp}$ the parameter p of item m, $b_{mq}$ the parameter q of item m, $a_{np}$ the parameter p of item n, and $b_{nq}$ the parameter q of item n, calculating a pair of weights $w_p$ and $w_q$ based on $a_{mp}$, $b_{mq}$, $a_{np}$ and $b_{nq}$, and based on $a_{mp}$, $b_{mq}$, $a_{np}$ and $b_{nq}$, storing the pair of weights, determining a first vertex item comprising the greatest value for the parameter p, a second vertex item comprising the greatest value for the parameter q, and a third vertex comprising the greatest value for a parameter r, generating a plurality of points based on stored and determined values, and displaying a geometric shape comprising the plurality of points.

20 Claims, 11 Drawing Sheets

(58) Field of Classification Search
USPC .......................................................... 707/723
See application file for complete search history.

(56) References Cited

U.S. PATENT DOCUMENTS

| | | | | |
|---|---|---|---|---|
| 8,949,263 | B1* | 2/2015 | Rosner | G06F 16/35 |
| | | | | 707/758 |
| 9,152,714 | B1* | 10/2015 | Dijk | G06F 16/24575 |
| 10,083,236 | B2* | 9/2018 | Crosby | G06F 16/219 |
| 10,282,431 | B1* | 5/2019 | Bhotika | G06F 16/5838 |
| 10,489,462 | B1* | 11/2019 | Rogynskyy | G06F 16/906 |
| 10,606,872 | B1* | 3/2020 | Shelton | G06F 16/3349 |
| 11,373,233 | B2* | 6/2022 | Pande | G06N 3/0454 |
| 11,423,076 | B2* | 8/2022 | Bhotika | G06F 16/248 |
| 2003/0004925 | A1* | 1/2003 | Knoblock | G06Q 10/06 |
| 2003/0004966 | A1* | 1/2003 | Bolle | G06F 16/735 |
| | | | | 707/E17.103 |
| 2005/0038533 | A1* | 2/2005 | Farrell | G06F 16/9024 |
| | | | | 707/E17.011 |
| 2007/0270985 | A1* | 11/2007 | Shellshear | G06F 3/0481 |
| | | | | 700/226 |
| 2014/0114975 | A1* | 4/2014 | Rouat | G06F 16/21 |
| | | | | 707/737 |
| 2015/0127650 | A1* | 5/2015 | Carlsson | G06F 16/3334 |
| | | | | 707/737 |
| 2016/0350442 | A1* | 12/2016 | Crosby | G06F 16/2358 |
| 2017/0004454 | A1* | 1/2017 | Tang | H04L 67/306 |
| 2017/0344890 | A1* | 11/2017 | Parayatham | G06F 16/24578 |
| 2019/0034432 | A1* | 1/2019 | Rybalchenko | G06N 20/00 |
| 2020/0210056 | A1 | 7/2020 | Steppan | |
| 2021/0352098 | A1* | 11/2021 | Rogers | H04L 63/1425 |
| 2022/0004546 | A1* | 1/2022 | Rogers | G06F 16/252 |

\* cited by examiner $$\begin{pmatrix} \text{Intercept} & X_1 & X_2 & X_3 & X_4 \\ 1 & -1 & -1 & 1 & 1 \\ 1 & -1 & 0 & -1 & -1 \\ 1 & -1 & 0 & 1 & -1 \\ 1 & -1 & 1 & -1 & 1 \\ 1 & 0 & -1 & -1 & -1 \\ 1 & 0 & -1 & -1 & 1 \\ 1 & 0 & 0 & -1 & -1 \\ 1 & 0 & 0 & -1 & 1 \\ 1 & 0 & 0 & 1 & -1 \\ 1 & 0 & 0 & 1 & 1 \\ 1 & 0 & 1 & 1 & -1 \\ 1 & 0 & 1 & 1 & 1 \\ 1 & 1 & -1 & 1 & -1 \\ 1 & 1 & 0 & -1 & 1 \\ 1 & 1 & 0 & 1 & 1 \\ 1 & 1 & 1 & -1 & -1 \end{pmatrix}$$

Fig. 4C

| Intercept | $X_1$ | $X_2$ | $X_3$ | $X_4$ | $X_1X_2$ | $X_1X_3$ | $X_1X_4$ | $X_2X_3$ | $X_2X_4$ | $X_3X_4$ |
|---|---|---|---|---|---|---|---|---|---|---|
| 1 | -1 | -1 | 1 | 1 | -1 | 1 | 1 | -1 | -1 | 1 |
| 1 | -1 | 0 | -1 | -1 | 0 | 1 | 1 | 0 | 0 | 1 |
| 1 | -1 | 0 | 1 | -1 | 0 | -1 | 1 | 0 | 0 | -1 |
| 1 | -1 | 1 | -1 | 1 | -1 | 1 | -1 | -1 | 1 | -1 |
| 1 | 0 | -1 | -1 | -1 | 0 | 0 | 0 | 1 | 1 | 1 |
| 1 | 0 | -1 | -1 | 1 | 0 | 0 | 0 | 1 | -1 | -1 |
| 1 | 0 | 0 | -1 | -1 | 0 | 0 | 0 | 0 | 0 | 1 |
| 1 | 0 | 0 | -1 | 1 | 0 | 0 | 0 | 0 | 0 | -1 |
| 1 | 0 | 0 | 1 | -1 | 0 | 0 | 0 | 0 | 0 | -1 |
| 1 | 0 | 0 | 1 | 1 | 0 | 0 | 0 | 0 | 0 | 1 |
| 1 | 0 | 1 | 1 | -1 | 0 | 0 | 0 | 1 | -1 | -1 |
| 1 | 0 | 1 | 1 | 1 | 0 | 0 | 0 | 1 | 1 | 1 |
| 1 | 1 | -1 | 1 | -1 | -1 | 1 | -1 | -1 | 1 | -1 |
| 1 | 1 | 0 | -1 | 1 | 0 | -1 | 1 | 0 | 0 | -1 |
| 1 | 1 | 0 | 1 | 1 | 0 | 1 | 1 | 0 | 0 | 1 |
| 1 | 1 | 1 | -1 | -1 | 1 | -1 | -1 | -1 | -1 | 1 |

Fig. 4D

| Intercept | $X_1$ | $X_2$ | $X_3$ | $X_4$ | $X_1X_2$ | $X_1X_3$ | $X_1X_4$ | $X_2X_3$ | $X_2X_4$ | $X_3X_4$ | $X_1X_1$ | $X_2X_2$ |
|---|---|---|---|---|---|---|---|---|---|---|---|---|
| 1 | -1 | -1 | 1 | 1 | -1 | 1 | 1 | -1 | -1 | 1 | 1 | 1 |
| 1 | -1 | 0 | -1 | -1 | 0 | 1 | 1 | 0 | 0 | 1 | 1 | 0 |
| 1 | -1 | 0 | 1 | -1 | 0 | -1 | 1 | 0 | 0 | -1 | 1 | 0 |
| 1 | -1 | 1 | -1 | 1 | -1 | 1 | -1 | -1 | 1 | -1 | 1 | 1 |
| 1 | 0 | -1 | -1 | -1 | 0 | 0 | 0 | 1 | 1 | 1 | 0 | 1 |
| 1 | 0 | -1 | -1 | 1 | 0 | 0 | 0 | 1 | -1 | -1 | 0 | 1 |
| 1 | 0 | 0 | -1 | -1 | 0 | 0 | 0 | 0 | 0 | 1 | 0 | 0 |
| 1 | 0 | 0 | -1 | 1 | 0 | 0 | 0 | 0 | 0 | -1 | 0 | 0 |
| 1 | 0 | 0 | 1 | -1 | 0 | 0 | 0 | 0 | 0 | -1 | 0 | 0 |
| 1 | 0 | 0 | 1 | 1 | 0 | 0 | 0 | 0 | 0 | 1 | 0 | 0 |
| 1 | 0 | 1 | 1 | -1 | 0 | 0 | 0 | 1 | -1 | -1 | 0 | 1 |
| 1 | 0 | 1 | 1 | 1 | 0 | 0 | 0 | 1 | 1 | 1 | 0 | 1 |
| 1 | 1 | -1 | 1 | -1 | -1 | 1 | -1 | -1 | 1 | -1 | 1 | 1 |
| 1 | 1 | 0 | -1 | 1 | 0 | -1 | 1 | 0 | 0 | -1 | 1 | 0 |
| 1 | 1 | 0 | 1 | 1 | 0 | 1 | 1 | 0 | 0 | 1 | 1 | 0 |
| 1 | 1 | 1 | -1 | -1 | 1 | -1 | -1 | -1 | -1 | 1 | 1 | 1 |

SYSTEM AND METHOD FOR FILTERING A DATA SET AND/OR SELECTING AT LEAST ONE ITEM OF THE DATA SET

FIELD OF THE INVENTION

The present invention relates to a system for filtering a data set comprising a plurality of items and/or selecting one item or more of the plurality of items. The present invention also relates to a method for filtering a data set comprising a plurality of items and/or selecting one item or more of the plurality of items. According to a further aspect of the invention, the present disclosure is directed to a client-server based visualization technique that employs graphical user interface to enable users to choose an item within a finite set of items, tailored to the user unique application needs. Each item may be characterized by a number of numerical attributes.

BACKGROUND ART

It is very common that a certain industry needs to optimize a process or refine/develop a new product. In both situations, experimentation is key and it is at the heart of innovation. Efficient experimentation strives for gaining knowledge on a process or product to make the best decision at a minimal cost.

It is of great importance to get a suitable experimental plan for a given situation, because a small and efficient experimental design can save precious time and resources. Design of experiments, DoE, is the area of statistics that studies how experiments can be planned efficiently. The main application areas of DoE are in situations where getting the data is very expensive (for example when expensive prototypes have to be build, or expensive equipment or large resources are assigned to carry on the experimental tests). DoE is all about small and expensive data.

When we talk about efficient experimentation, we talk about using a minimal amount of resources while guaranteeing high capacity of knowledge discovery and product or process optimization capabilities.

Every situation is different and the experimental design should adapt to its particularities (not the other way around). The differences can come from different aspects of the problem: objectives of the experiment, limitation on the number of tests that can be performed, number of factors, type of the factors, etc.

In existing statistical software there are two options to obtain an experimental design for a given situation. One of them allows obtaining the design from a reduced catalog of designs given a number of factors. These are designs that have been discovered since the forties, and that have been proved to have good statistical properties. However, very often it is not an option to choose a design from a catalog because the choice is limited to a few designs that are very often too large to be of a practical use. This limitation makes this option not flexible.

Another known option is obtaining a targeted optimal design. In this approach, a design that adapts to the experimental circumstances is generated on the fly. This design is obtained considering a single quality criterion. It is like, in an analogy, you would buy a computer by only looking at the price. The obtained design is very good in terms of the chosen quality criteria and it adapts to the number of factors and number of available tests for the experiment. However, it may not perform well in other attributes. This limitation makes this option not efficient.

Existing DoE software to compare designs allows to compare a very low number of designs at the same time, for instance five designs. Furthermore, the designs need to have been obtained and saved in individual files beforehand what means that obtaining each design took a significant amount of time. The designs are compared in respect to a model that has to be specified by the user.

For instance, with a well-known DoE software, if you need to optimize a process of cleaning a silicon wafer by minimizing the number of defect dice, there are 7 factors that are believed to influence the percentage of defect dice. Furthermore, silicon wafers are expensive, and you cannot use more than 26 wafers in the experiment. 2-level designs and 3-level designs are known to perform well for different criteria. However they are either too small or too large. On the one hand, when you need 2-level for your factors, the only options are designs with 16 runs, which is too small as there is a budget of 26 experimental runs. On the other hand, if you need 3-levels for your factors, the smallest design you get has 64 runs. In the software, the only information you get on these designs is their name, the number of runs (tests) and the type of model that they can fit.

SUMMARY OF THE INVENTION

The object of the invention is to provide an apparatus and/or method that can efficiently select an item or experimental design for given item or experimental conditions from a computer database.

According to the present invention, a method is provided as defined in independent claim 1. This allows for a catalog-based approach optimizing the use of industry resources to gain the maximum possible knowledge at a minimal experimental cost.

In the prior art, the boundaries between the different areas in the ternary plot are calculated using a Mont Carlo approach, this is, checking for a multitude of sets of weights which item(s) had the highest score and then color the ternary plot accordingly.

The solution proposed in the invention produces an exact solution, while the Monte Carlo approach is an approximation as there are infinite sets of weights within the ternary plot. This means that the invention provides a much more accurate ternary plot. Furthermore, the algorithm of the invention has a predictable runtime, while the start-of-the-art not. The algorithm according to the invention is more memory efficient than the state-of-the-art, as it does not need to store the results for a multitude of points in the ternary plot.

The method and apparatus according to the invention allows to efficiently search a catalog of experimental designs by filtering a database using different filters. Another aspect of the invention also allows to efficiently compare experimental designs. Such computer-implemented method may comprise displaying, by the operating system in a display of the computer device, a ternary plot based on the stored first and second weights. According to the embodiments of the present invention, a method is provided to calculate the points that define the dominance regions in a ternary plot of a given set of items characterized by three numerical attributes. The method comprises generating, by a processing unit, a geometric shape comprising a plurality of points. The method comprises the generation, on an output device, of a visual representation of the plurality of points in the form of a ternary plot. The ternary plot indicates which items are dominating for any choice of weights points. Each area represents the most efficient design for a given set of weights of the indicators. The triangle areas may show the identifier of the corresponding design(s). The color maps on correlations may be available in an interactive way, such that the user can zoom to explore a certain area and the user gets extra information when selecting different parts if the graph. All the information is retrieved from a database, and not calculated on the fly, thereby saving time and providing an efficient system.

A user can obtain a recommended design that performs well in the quality indicators that have been selected. This algorithm is based on the utopia method. An example of said utopia method is described, for instance, in "Survey of multi-objective optimization methods for engineering". by R. T. Marler and J. S. Arora, Structural and Multidisciplinary Optimization 26, 369-395 (2004).

The invention also relates to a computer device and a computer system comprising a computer device and a server configured to perform the method according to the claims.

The invention relates as well to a computer implemented program comprising instructions to perform the method according to the claims. The invention relates as well to a computer-implemented method of generating a visual representation of items, the method comprising:

(a) selecting, at an operating system, a pair of items m and n from a plurality of items, wherein each item of the plurality of items comprises a plurality of parameters, each parameter of the plurality of parameters representing a property of the plurality of items;

(b) for the selected pair of items m and n, selecting, at the operating system, a pair of parameters p and q from the plurality of parameters, wherein $a_{mp}$ is the parameter p of the item m, $b_{mq}$ is the parameter q of the item m, $a_{np}$ is the parameter p of the item n, and $b_{nq}$ is the parameter q of the item n;

(c) calculating, at the operating system, a pair of weights $w_p$ and $w_q$ wherein $w_p$ is calculated based on $a_{mp}$, $b_{mq}$, $a_{np}$ and $b_{nq}$, and wherein $w_q$ is calculated based on $a_{mp}$, $b_{mq}$, $a_{np}$ and $b_{nq}$;

(d) if $w_p > 0$ and $w_q > 0$, storing, in a memory by the operating system, the pair of weights $w_p$ and $w_q$ and the pair of items m and n;

(e) determining, at the operating system, a first vertex item, a second vertex item and a third vertex item, wherein the first vertex item is the item of the plurality of items comprising the greatest value for the parameter p, the second vertex item is the item of the plurality of items comprising the greatest value for the parameter q, and the third vertex item is the item of the plurality of items comprising the greatest value for a parameter r from the plurality of parameters;

(f) generating, at the operating system, a plurality of points based on the stored pair of weights $w_p$ and $w_q$ and the pair of items m and n, the first vertex item, the second vertex item and the third vertex item; and (g) displaying, in a display screen by the operating system, the visual representation of the plurality of items by displaying a plot comprising a geometric shape and comprising the plurality of points.

The computer-implemented method further comprises the steps of:

(I) selecting, at the operating system, a set of three items i, j and k from the plurality of items;

(II) for the selected set of three items i, j and k, selecting, at the operating system, a set of three parameters p, q and r from the plurality of parameters, wherein $a_{ip}$ is the parameter p of the item i, $b_{iq}$ is the parameter q of the item i, $c_{ir}$ is the parameter r of the item i, $a_{jp}$ is the parameter p of the item j, $b_{jq}$ is the parameter q of the item j, $c_{jr}$ is the parameter r of the item j, $a_{kp}$ is the parameter p of the item k, $b_{kq}$ is the parameter q of the item k, and $c_{kr}$ is the parameter r of the item k;

(III) calculating, at the operating system, a set of three weights $w_p$, $w_q$ and $w_r$ wherein $w_p$ is calculated based on $a_{ip}$, $b_{iq}$, $c_{ir}$, $a_{jp}$, $b_{jq}$, $c_{jr}$, $a_{kp}$, $b_{kq}$, and $c_{kr}$, $w_q$ is calculated based on $a_{ip}$, $b_{iq}$, $c_{ir}$, $a_{jp}$, $b_{jq}$, $c_{jr}$, $a_{kp}$, $b_{kq}$, and $c_{kr}$ and $w_r$ is calculated based on $a_{ip}$, $b_{iq}$, $c_{ir}$, $a_{jp}$, $b_{jq}$, $c_{jr}$, $a_{kp}$, $b_{kq}$, and $c_{kr}$; and (IV) if $w_p > 0$, $w_q > 0$ and $w_r > 0$, storing, in the memory by the operating system, the set of three weight values $w_p$, $w_q$ and $w_r$ and the set of three items i, j and k;

wherein step (f) further comprises generating the plurality of points based on the stored set of three weight values $w_p$, $w_q$ and $w_r$ and the set of three items i, j and k.

The computer-implemented may further comprise repeating steps (a) through (d) for each pair of items m and n from the plurality of items.

The computer-implemented method may further comprise repeating steps (b) through (d) for each pair of parameters p and q from the plurality of parameters.

The computer-implemented method may further comprise repeating the steps (I) through (IV) for each set of three items i, j and k from the plurality of items.

The computer-implemented method may further comprise repeating steps (II) through (IV) for each set of three parameters p, q and r from the plurality of parameters.

The pair of weights $w_p$ and $w_q$ in step (c) may be calculated such that:

$$(w_p * a_{mp}) + (w_q * b_{mq}) = (w_p * a_{np}) + (w_q * b_{nq}), \text{ and}$$

$$w_p + w_q = 1.$$

The set of three weights $w_p$, $w_q$ and $w_r$ in step (III) may be calculated such that:

$$(w_p * a_{ip}) + (w_q * b_{iq}) + (w_r * c_{ir}) = (w_p * a_{jp}) + (w_q * b_{jq}) + (w_r * c_{jr}),$$

$$(w_p * a_{ip}) + (w_q * b_{iq}) + (w_r * c_{ir}) = (w_p * a_{kp}) + (w_q * b_{kq}) + (w_r * c_{kr}), \text{ and}$$

$$w_p + w_q + w_r = 1.$$

Generating the plurality of points in step (f) may further comprise:

calculating, at the operating system, a score value of the stored pair of weight values $w_p$ and $w_q$ and the pair of items m and n, wherein said score value is calculated as a linear combination of $w_p$, and $w_q$ and the plurality of parameters of one of the pair of items m and n; and determining whether to discard the stored set pair of weight values $w_p$, and $w_q$ and the pair of items m and n based on the calculated score value;

or calculating, at the operating system, a score value of the stored set of three weight values $w_p$, $w_q$ and $w_r$ and the set of three items i, j and k, wherein said score value is calculated as a linear combination of $w_p$, $w_q$ and $w_r$ and the plurality of parameters of one of the three items i, j and k; and determining whether to discard the stored set of three weight values $w_p$, $w_q$ and $w_r$ and the set of three items i, j and k based on the calculated score value.

Determining whether to discard the stored set pair of weight values $w_p$, and $w_q$ and the pair of items m and n may further comprise:

calculating, at the operating system, another score value for each item of the plurality of items as a linear combination of the stored pair of weight values $w_p$, and $w_q$ and the plurality of parameters of one of the pair of items m and n;

obtaining, at the operating system, a comparison value based on the score value and the another score value; and determining whether to discard the stored set pair of weight values $w_p$, and $w_q$ and the pair of items m and n based on the comparison value;

Determining whether to discard the stored set of three weight values $w_p$, $w_q$ and $w_r$ and the set of three items i, j and k may further comprise:

calculating, at the operating system, another score value for each item of the plurality of items as a linear combination of the stored set of three weight values $w_p$, $w_q$ and $w_r$ and the plurality of parameters of one of the three items i, j and k;

obtaining, at the operating system, a comparison value based on the score value and the another score value; and determining whether to discard the stored set of three weight values $w_p$, $w_q$ and $w_r$ and the set of three items i, j and k based on the comparison value.

Each parameter of the plurality of parameters may further comprise a direction value and the method may further comprise performing, at the operating system, a transformation of at least one parameter of at least one item of the plurality of items based on the direction of the at least one parameter.

Performing the transformation may comprise performing a sign change operation of the at least one parameter of the at least one item.

The direction value of a parameter may indicate one of two directions of improvement for said parameter and performing the transformation of the at least one parameter based on the direction may further comprise performing the transformation if the direction value indicates a determined direction of improvement.

The plot may be a ternary plot and each item of the plurality of items identifies an experimental model.

The computer-implemented method may further comprise receiving an input, by the operating system, to select an item in the displayed ternary plot.

The invention may further refer to a computer device for generating a visual representation of items, the computer device comprising a display, one or more processors, memory and one or more programs stored in the memory and configured for execution of the one or more processors, the one or more programs comprising instructions for:

(a) Selecting a pair of items m and n from a plurality of items, wherein each item of the plurality of items comprises a plurality of parameters, each parameter of the plurality of parameters representing a property of the plurality of items;

(b) for the selected pair of items m and n, selecting a pair of parameters p and q from the plurality of parameters, wherein $a_{mp}$ is the parameter p of the item m, $b_{mq}$ is the parameter q of the item m, $a_{np}$ is the parameter p of the item n, and $b_{nq}$ is the parameter q of the item n;

(c) calculating a pair of weights $w_p$ and $w_q$ wherein $w_p$ is calculated based on $a_{mp}$, $b_{mq}$, $a_{np}$ and $b_{nq}$, and wherein $w_q$ is calculated based on $a_{mp}$, $b_{mq}$, $a_{np}$ and $b_{nq}$;

(d) if $w_p > 0$ and $w_q > 0$, storing, in the memory, the pair of weights $w_p$ and $w_q$ and the pair of items m and n;

(e) determining a first vertex item, a second vertex item and a third vertex item, wherein the first vertex item is the item of the plurality of items comprising the greatest value for the parameter p, the second vertex item is the item of the plurality of items comprising the greatest value for the parameter q, and the third vertex item is the item of the plurality of items comprising the greatest value for a parameter r from the plurality of parameters;

(f) generating a plurality of points based on the stored pair of weights $w_p$ and $w_q$ and the pair of items m and n, the first vertex item, the second vertex item and the third vertex item; and (g) displaying, in the display, the visual representation of the plurality of items by displaying a plot comprising a geometric shape and comprising the plurality of points.

The one or more programs may further comprise instructions for:

(I) Selecting a set of three items i, j and k from the plurality of items;

(II) for the selected set of three items i, j and k, selecting a set of three parameters p, q and r from the plurality of parameters, wherein $a_{ip}$ is the parameter p of the item i, $b_{iq}$ is the parameter q of the item i, $c_{ir}$ is the parameter r of the item i, $a_{jp}$ is the parameter p of the item j, $b_{jq}$ is the parameter q of the item j, $c_{jr}$ is the parameter r of the item j, $a_{kp}$ is the parameter p of the item k, $b_{kq}$ is the parameter q of the item k, and $c_{kr}$ is the parameter r of the item k;

(III) calculating a set of three weights $w_p$, $w_q$ and $w_r$ wherein $w_p$ is calculated based on $a_{ip}$, $b_{iq}$, $c_{ir}$, $a_{kp}$, $b_{kq}$, and $c_{kr}$, $w_q$ is calculated based on $a_{ip}$, $b_{iq}$, $c_{ir}$, $a_{jp}$, $b_{jq}$, $c_{jr}$, $a_{kp}$, $b_{kq}$, and $c_{kr}$ and $w_r$ is calculated based on $a_{ip}$, $b_{iq}$, $c_{ir}$, $a_{jp}$, $b_{jq}$, $c_{jr}$, $a_{kp}$, $b_{kq}$, and $c_{kr}$; and (IV) if $w_p > 0$, $w_q > 0$ and $w_r > 0$, storing, in the memory, the set of three weight values $w_p$, $w_q$ and $w_r$ and the set of three items i, j and k;

wherein step (f) further comprises generating the plurality of points based on the stored set of three weight values $w_p$, $w_q$ and $w_r$ and the set of three items i, j and k.

The one or more programs may further comprise instructions for repeating (a) through (d) for each pair of items m and n from the plurality of items.

The one or more programs may further comprise instructions for repeating (b) through (d) for each pair of parameters p and q from the plurality of parameters.

The one or more programs may further comprise instructions for repeating (I) through (IV) for each set of three items i, j and k from the plurality of items.

The one or more programs may further comprise instructions for repeating (II) through (IV) for each set of three parameters p, q and r from the plurality of parameters.

The one or more programs may further comprise instructions for calculating the pair of weights $w_p$ and $w_q$ in (c) such that:

$$(w_p * a_{mp}) + (w_q * b_{mq}) = (w_p * a_{np}) + (w_q * b_{nq}), \text{ and}$$

$$w_p + w_q = 1.$$

The one or more programs may further comprise instructions for calculating the set of three weights $w_p$, $w_q$ and $w_r$ in (III) such that:

$$(w_p * a_{ip}) + (w_q * b_{iq}) + (w_r * c_{ir}) = (w_p * a_{jp}) + (w_q * b_{jq}) + (w_r * c_{jr}),$$

$$(w_p * a_{ip}) + (w_q * b_{iq}) + (w_r * c_{ir}) = (w_p * a_{kp}) + (w_q * b_{kq}) + (w_r * c_{kr}), \text{ and}$$

$$w_p + w_q + w_r = 1.$$

The one or more programs may further comprise instructions for generating the plurality of points in (f) by:
  Calculating a score value of the stored pair of weight values $w_p$ and $w_q$ and the pair of items m and n, wherein said score value is calculated as a linear combination of $w_p$, and $w_q$ and the plurality of parameters of one of the pair of items m and n; and
  determining whether to discard the stored set pair of weight values $w_p$, and $w_q$ and the pair of items m and n based on the calculated score value;
or by:
  calculating a score value of the stored set of three weight values $w_p$, $w_q$ and $w_r$ and the set of three items i, j and k, wherein said score value is calculated as a linear combination of $w_p$, $w_q$ and $w_r$ and the plurality of parameters of one of the three items i, j and k; and
  determining whether to discard the stored set of three weight values $w_p$, $w_q$ and $w_r$ and the set of three items i, j and k based on the calculated score value.

The one or more programs may further comprise instructions for determining whether to discard the stored set pair of weight values $w_p$, and $w_q$ and the pair of items m and n by:
  Calculating another score value for each item of the plurality of items as a linear combination of the stored pair of weight values $w_p$, and $w_q$ and the plurality of parameters of one of the pair of items m and n;
  Obtaining a comparison value based on the score value and the another score value; and
  determining whether to discard the stored set pair of weight values $w_p$, and $w_q$ and the pair of items m and n based on the comparison value;
  The one or more programs may further comprise instructions for determining whether to discard the stored set of three weight values $w_p$, $w_q$ and $w_r$ and the set of three items i, j and k by:
  calculating another score value for each item of the plurality of items as a linear combination of the stored set of three weight values $w_p$, $w_q$ and $w_r$ and the plurality of parameters of one of the three items i, j and k;
  obtaining a comparison value based on the score value and the another score value; and
  determining whether to discard the stored set of three weight values $w_p$, $w_q$ and $w_r$ and the set of three items i, j and k based on the comparison value.

Each parameter of the plurality of parameters may further comprise a direction value and the one or more programs may further comprise instructions for performing a transformation of at least one parameter of at least one item of the plurality of items based on the direction of the at least one parameter.

The one or more programs may further comprise instructions for performing the transformation by performing a sign change operation of the at least one parameter of the at least one item.

The direction value of a parameter may indicate one of two directions of improvement for said parameter and the one or more programs may further comprise instructions for performing the transformation of the at least one parameter based on the direction by performing the transformation if the direction value indicates a determined direction of improvement.

The one or more programs may further comprise instructions for receiving an input to select an item in the displayed ternary plot.

The invention further relates to a non-transitory computer-readable storage medium storing one or more programs configured for execution by a computer system having a display, one or more processors, and memory, the one or more programs comprising instructions for:

(a) Selecting a pair of items m and n from a plurality of items, wherein each item of the plurality of items comprises a plurality of parameters, each parameter of the plurality of parameters representing a property of the plurality of items;

(b) for the selected pair of items m and n, selecting a pair of parameters p and q from the plurality of parameters, wherein $a_{mp}$ is the parameter p of the item m, $b_{mq}$ is the parameter q of the item m, $a_{np}$ is the parameter p of the item n, and $b_{nq}$ is the parameter q of the item n;

(c) calculating a pair of weights $w_p$ and $w_q$ wherein $w_p$ is calculated based on $a_{mp}$, $b_{mq}$, $a_{np}$ and $b_{nq}$, and wherein $w_q$ is calculated based on $a_{mp}$, $b_{mq}$, $a_{np}$ and $b_{nq}$;

(d) if $w_p > 0$ and $w_q > 0$, storing, in the memory, the pair of weights $w_p$ and $w_q$ and the pair of items m and n;

(e) determining a first vertex item, a second vertex item and a third vertex item, wherein the first vertex item is the item of the plurality of items comprising the greatest value for the parameter p, the second vertex item is the item of the plurality of items comprising the greatest value for the parameter q, and the third vertex item is the item of the plurality of items comprising the greatest value for a parameter r from the plurality of parameters;

(f) generating a plurality of points based on the stored pair of weights $w_p$ and $w_q$ and the pair of items m and n, the first vertex item, the second vertex item and the third vertex item; and (g) displaying, in the display, the visual representation of the plurality of items by displaying a plot comprising a geometric shape and comprising the plurality of points.

Advantageous embodiments are claimed in dependent claims.

DETAILED DESCRIPTION OF THE DRAWINGS

Figure 5:
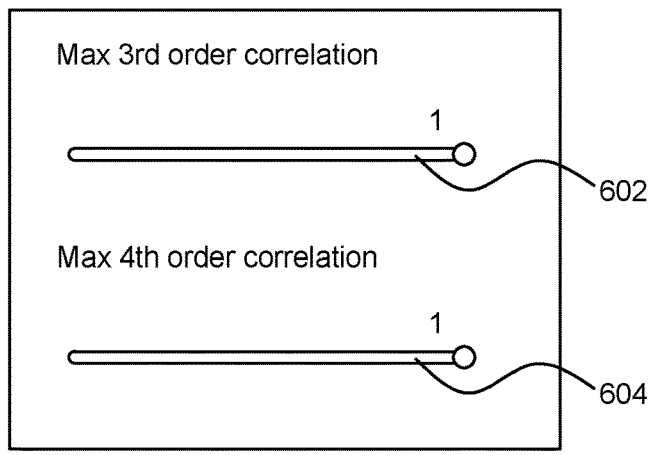
Figure 6:
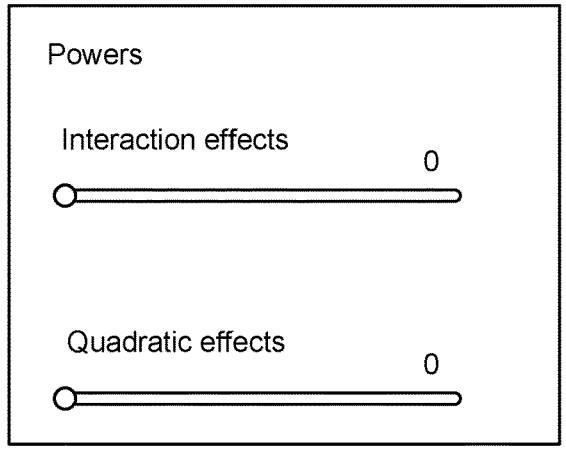
Figure 7:
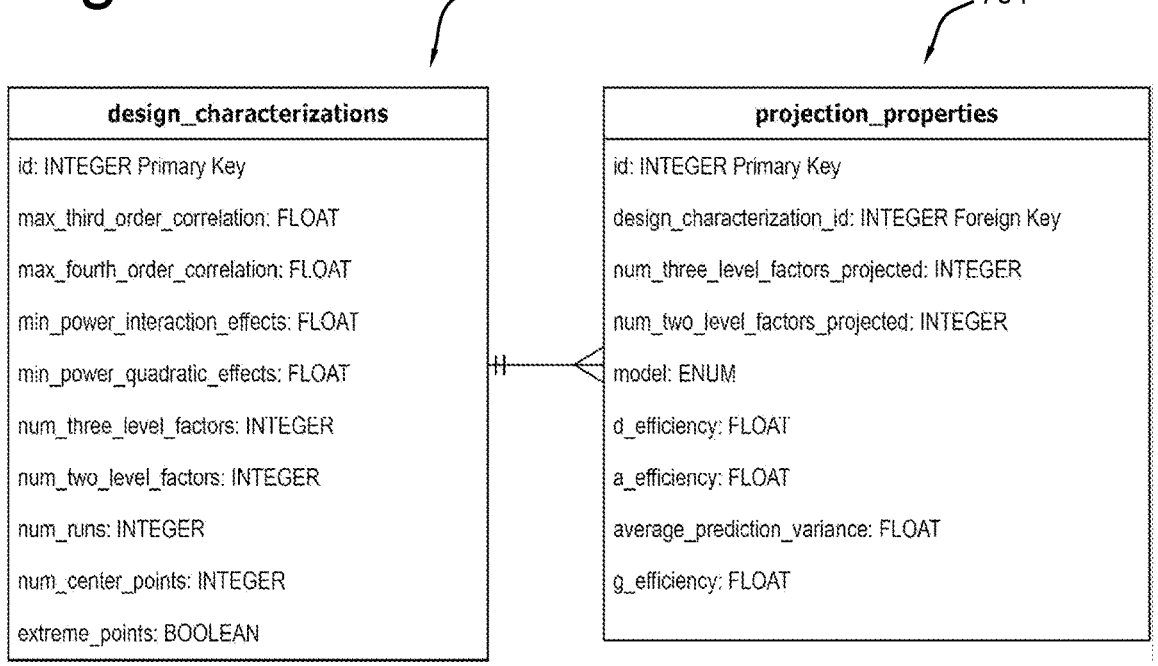
Figure 8:
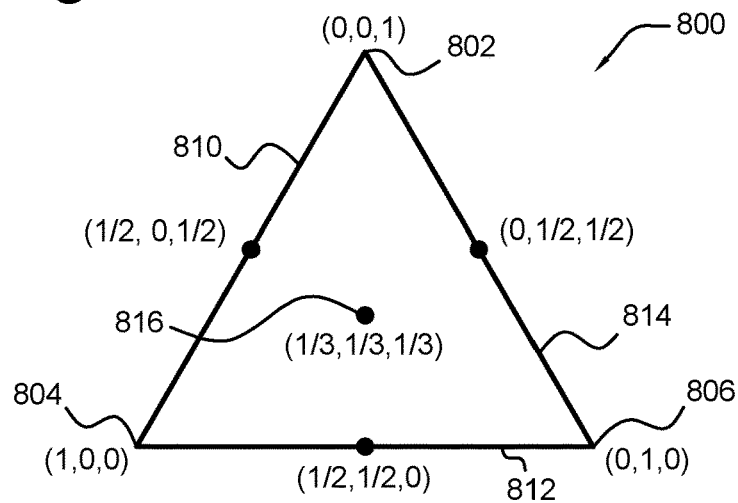
Figure 9:
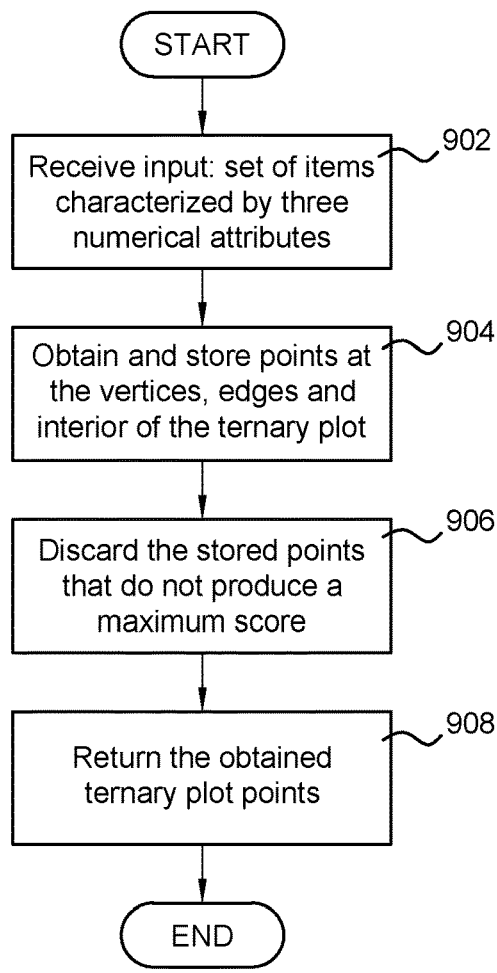
Figure 10:
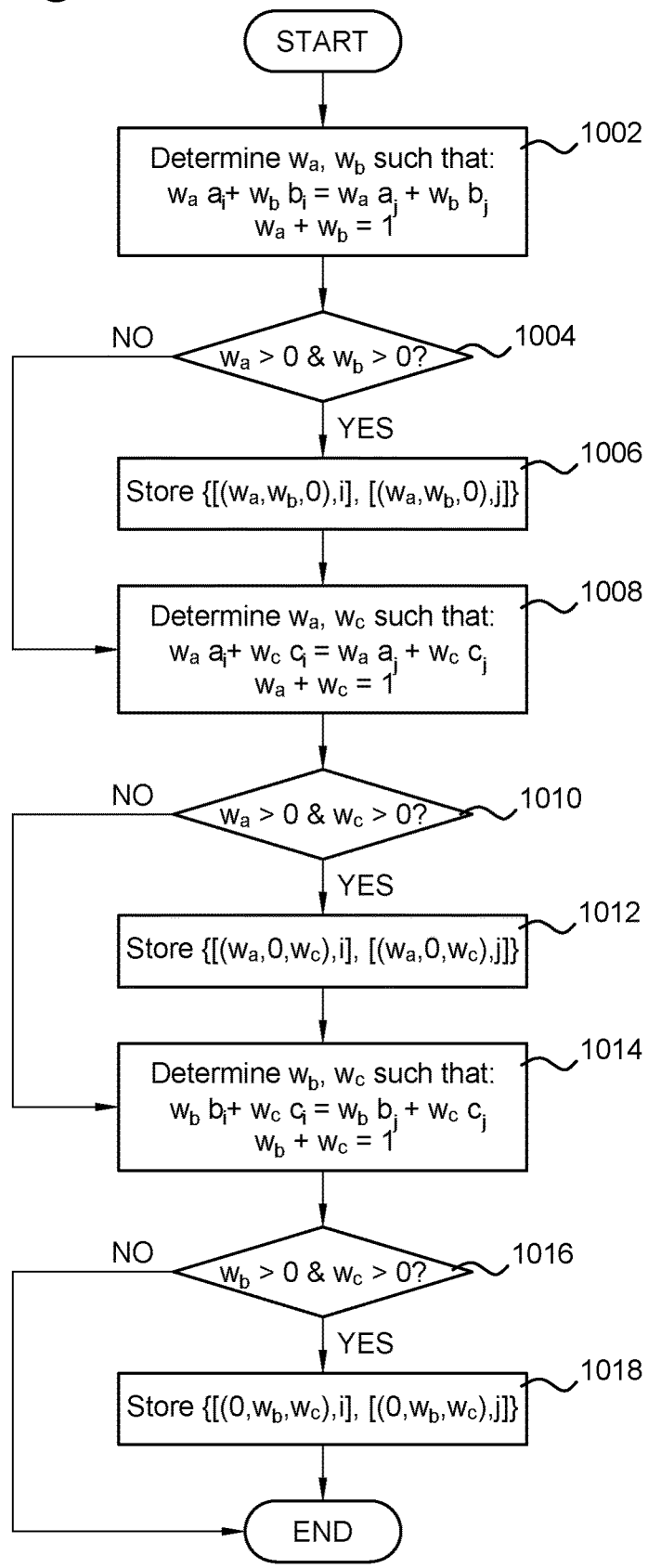
Figure 11:
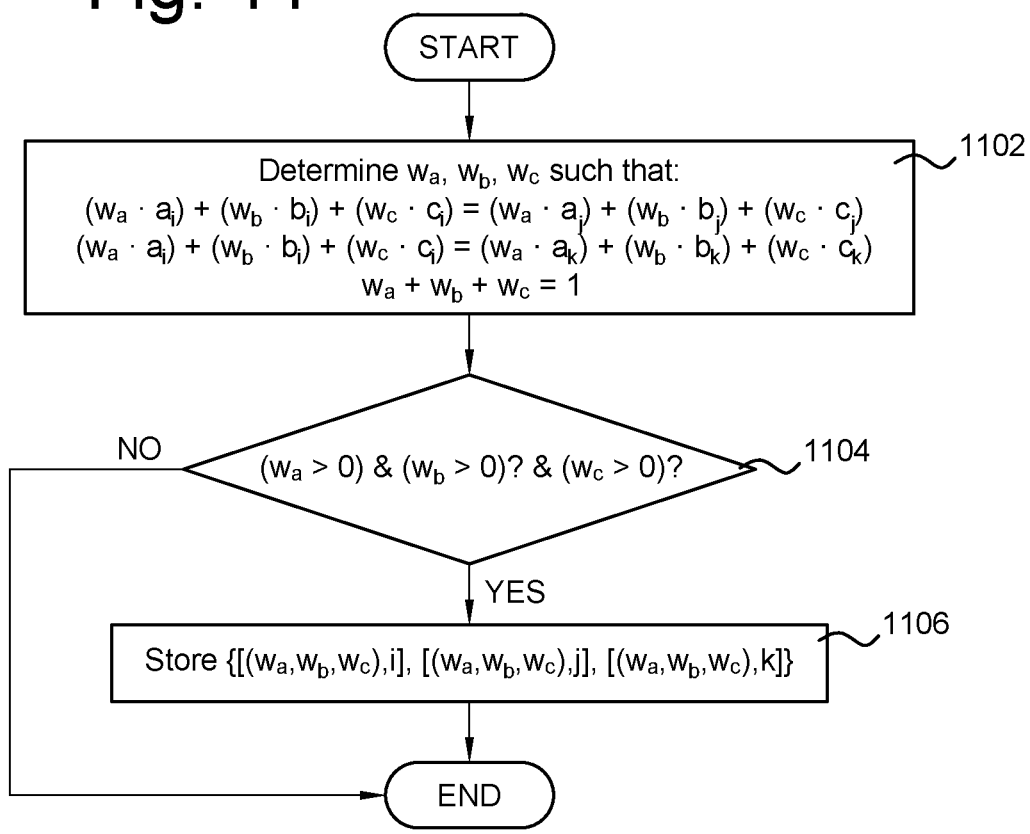
Figure 12:
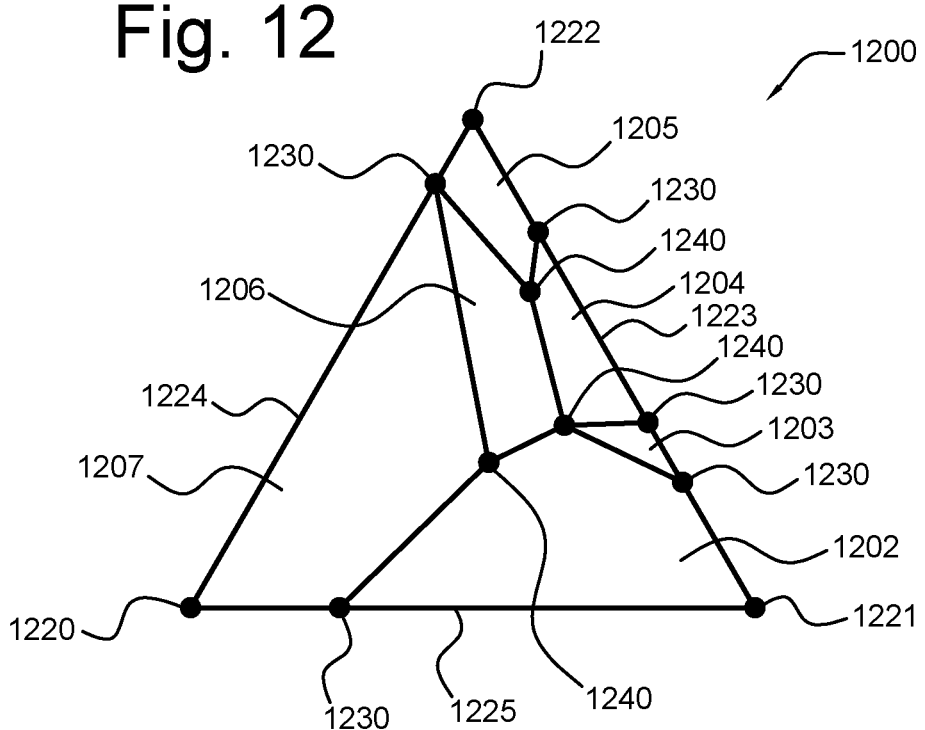
Figure 13:
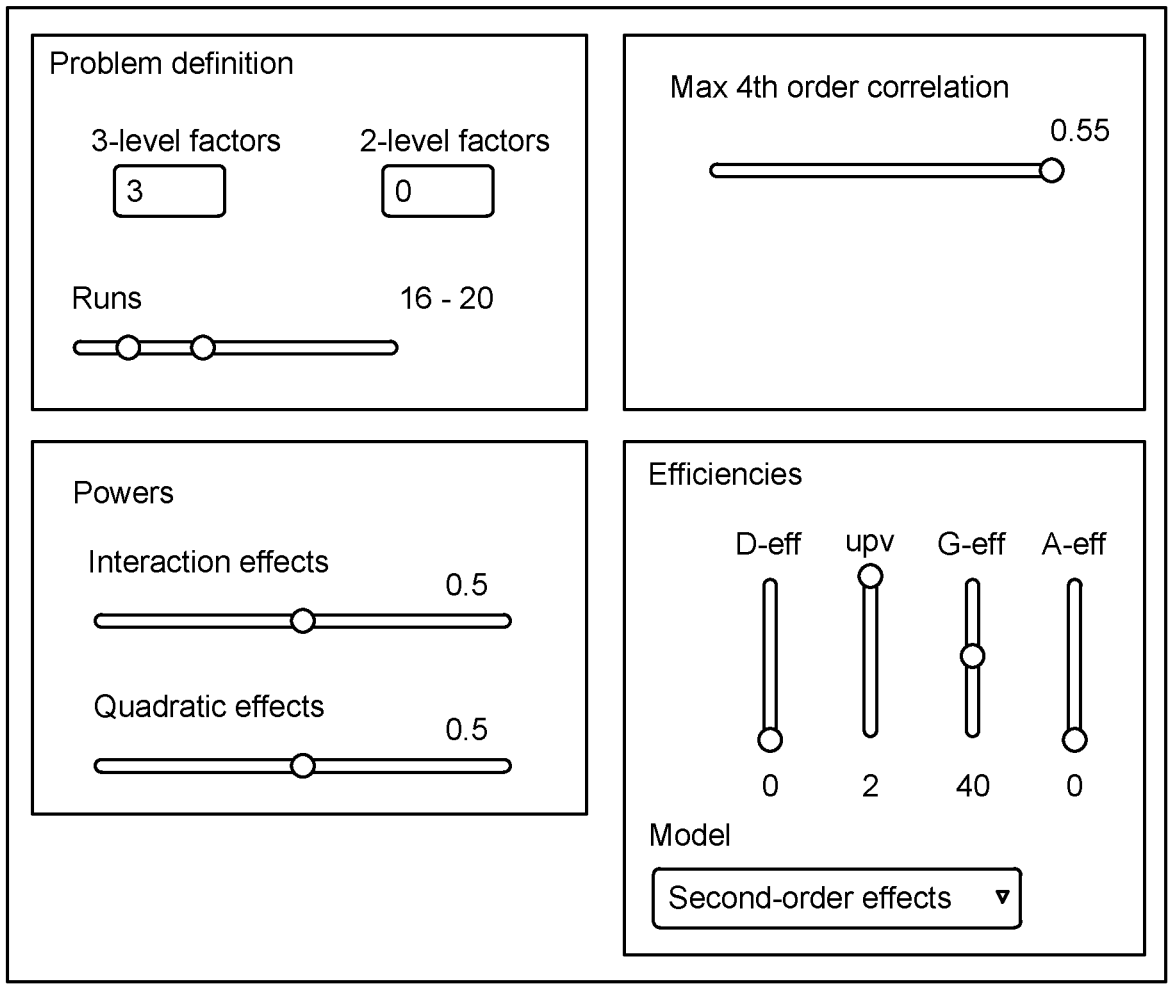
Figure 14:
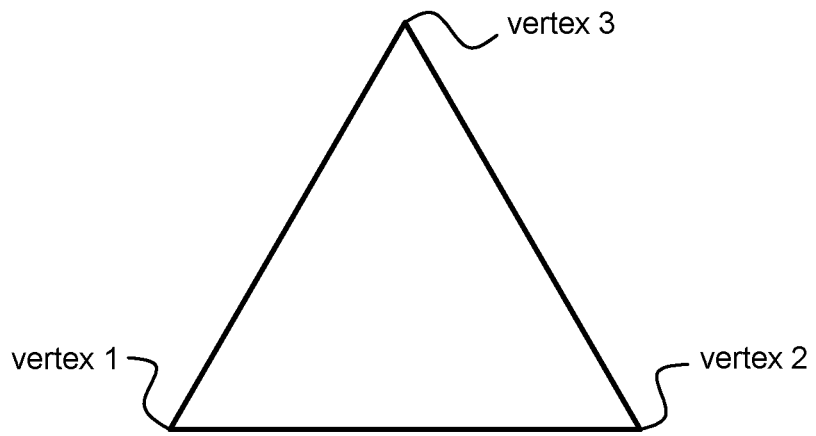
Figure 15A:
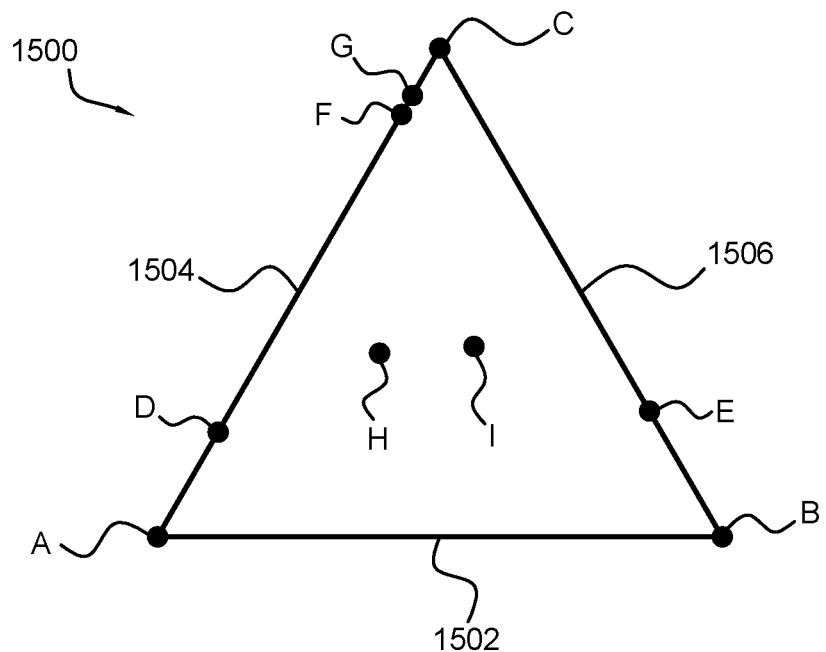
Figure 15B:
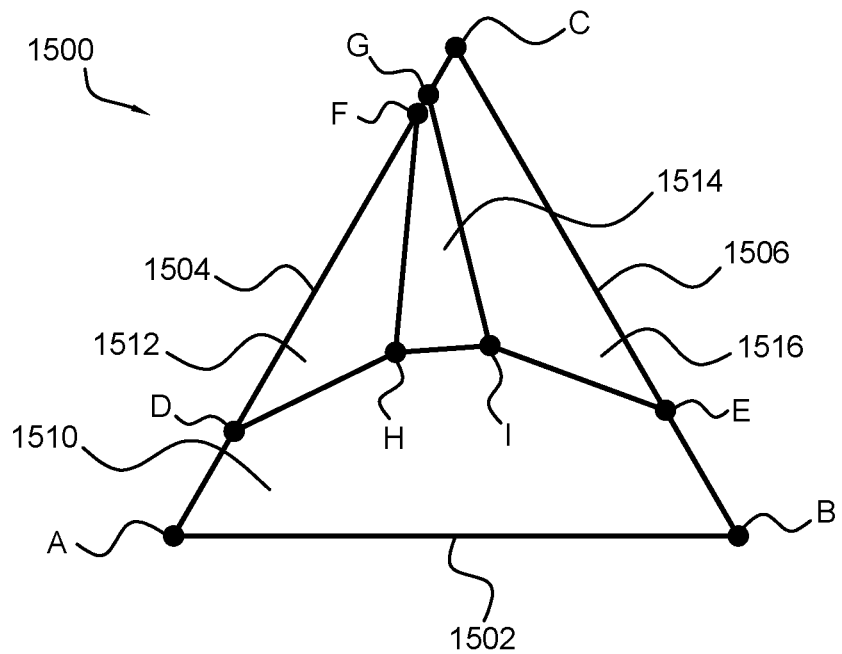

FIGS. 4A-D show examples of design matrices for an experimental design;

FIG. 5 shows an example of a computer implementation of a user interface to configure filtering data according to the maximum 3rd and 4th order correlations criterion;

FIG. 6 shows an example of a computer implementation of a user interface to configure filtering data according to power to detect interaction and quadratic effects criterion;

FIG. 7 shows an example of a related table of a database according to an embodiment of the invention;

FIG. 8 shows a ternary plot;

FIG. 9 shows a flow chart method to determine vertex, edge and internal points in a plot ternary according to an embodiment of the invention;

FIG. 10 shows a flow chart of a method to determine the edge points in a plot ternary according to an embodiment of the invention;

FIG. 11 shows a flow chart of a method to determine the internal points in a plot ternary according to an embodiment of the invention;

FIG. 12 shows a ternary plot according to an embodiment of the invention;

FIG. 13 shows a user interface according to an embodiment of the invention;

FIGS. 14 and 15A-B show ternary plots according to an embodiment of the invention;

DESCRIPTION OF EMBODIMENTS

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means including at least one A, including at least one B, or including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first element may be referred to as a second element without departing from the scope the present invention, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for" "having the capacity to" "designed to" "adapted to" "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context.

In the specification below, the same reference numbers in the drawings refer to the same elements/components. DoE is usually an approach using statistics to deal with planning efficient experiments to be used in product development and process improvement. In both product development and process improvement, it is of interest to know how the values of a given set of parameters (called factors) influence one or more outcomes (called responses). Usually an experiment is defined by the number and nature of the parameters or factors that are to be studied, together with the number and nature of the outcomes or responses that will be measured. An experiment is divided in tests, being the total number of tests another important feature of an experiment. The number of tests is directly related with the cost of an experiment, as an experiment with more tests will be more expensive in terms of time, man-power and materials, for example. The set of all the features describing an experiment, such as the number and nature of the parameters or factors, the number and nature of the outcomes or responses, and/or the number of tests, is called experimental conditions.

The detailed description of what values of the parameters or factors are to be used for each one of the tests in an experiment is called an experimental design or experimental plan.

An experimental design can be characterized using a multiplicity of statistical quality characteristics. These statistical quality characteristics can be numerical (take values equal to a real number) or categorical (take values within a given finite set of possibilities) in nature. The set of all statistical quality characteristics of a certain experimental design is called experimental design characterization.

Given certain experimental conditions, an experimental design with appropriate experimental design characterization is chosen from a database of experimental designs. Such a database contains several hundreds of thousands of experimental designs and it is stored in a computer database (denoted as Database system).

Figure 1A:
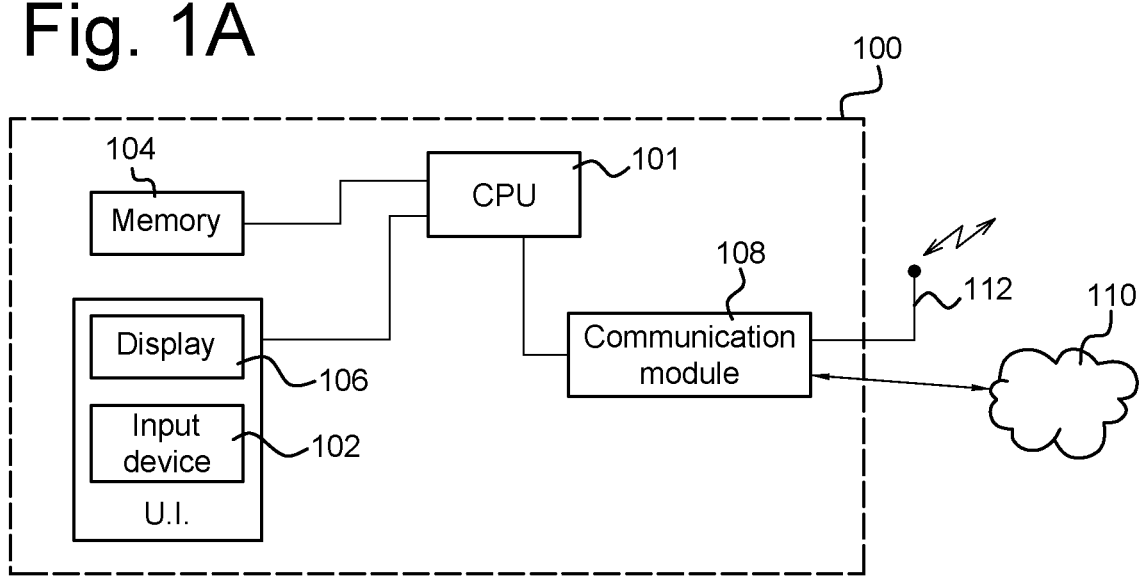
FIG. 1A shows a block diagram of an electronic device according to an embodiment of the present disclosure.

FIG. 1A presents a schematic overview of an example implementation of a computer device according to an embodiment of the present disclosure. The computer device 100 comprises a processor or Central Processing Unit, CPU, 101 which is connected to an input unit 102, memory 104, a display 106, and a communication module 108.

Input unit 102 may comprise any known device to allow an operator to generate data and instructions for CPU 101, like a keyboard, a mouse, one or more touch screens, etc.

Memory 104 may comprise any suitable known memory devices to store data and computer programs to be run on CPU 101, and may include any known type of volatile and non-volatile memory equipment, RAM and ROM types of memories, etc. A non-transitory computer-readable storage medium maybe any kind of memory such as a non-volatile RAM, etc. The computer programs comprise instructions to be loaded by CPU 101.

Output unit 106 may comprise any suitable output device to output data to a user including a display, etc.

Communication module 108 is configured to transmit and to receive signals from other electronic devices adapted to communicate with the electronic device 100. Any known and suitable transceiver equipment can be used for that purpose using any known or still to be developed (standard) communication technique including 2G, 3G, 4G, 5G, Wifi, Bluetooth, NFC, etc. To that end communication module 108 is connected to a network 110 and an antenna 112.

Figure 1B:
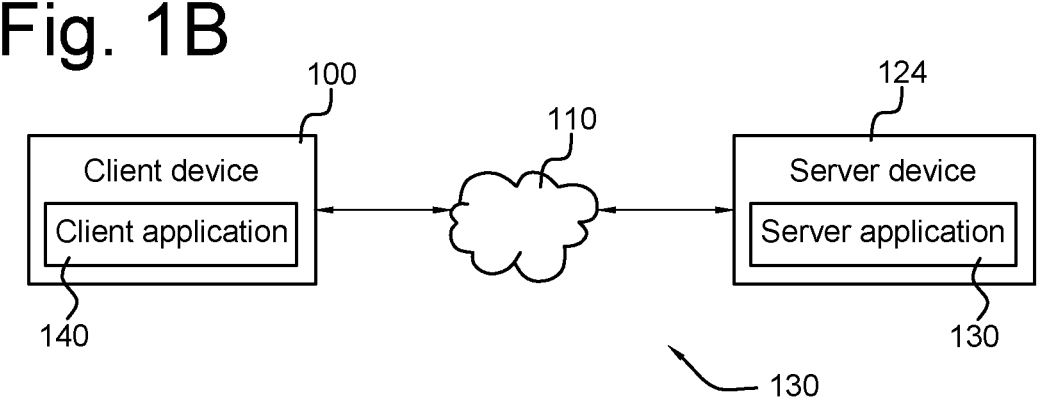
FIG. 1B shows a block diagram of a system according to an embodiment of the present disclosure.

FIG. 1B shows a block diagram of a client-server system 130 according to an embodiment of the present disclosure. The system 130 of FIG. 1B comprises an electronic client device 100 as the one shown in FIG. 1A and an electronic server device 124, as the one shown in FIG. 1D, connected through a network 110. The client device 100 comprises a client application 140 comprising instructions and stored in the memory 104. The CPU 101 is configured to execute the instructions of the client application 140. The electronic server device 124 comprises a server application 130 comprising instructions and stored in the memory 134. The CPU 131 is configured to execute the instructions of the server application 130. The client device 100 and the server device 124 are configured to communicate through the communication modules 138 and 108.

Figure 1C:
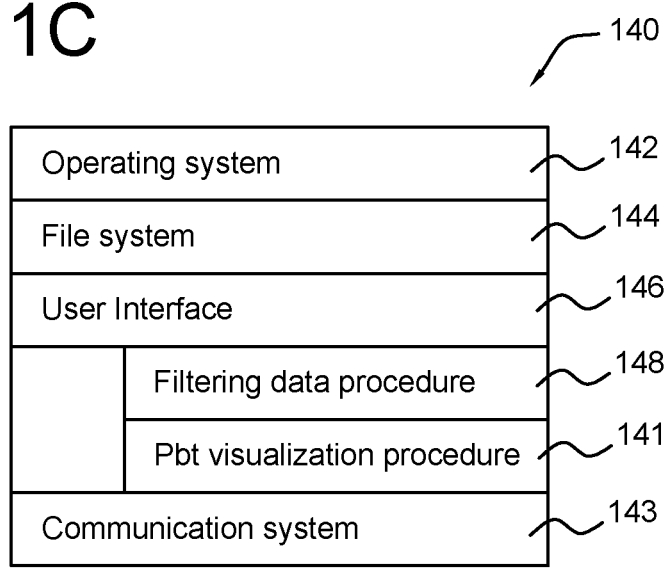
FIG. 1C shows a block diagram of a memory of an electronic client device according to an embodiment of the present disclosure.

FIG. 1C shows a block diagram of a memory of the electronic device 100 of FIG. 1A. according to an embodiment of the present disclosure. The client application 140 runs in an electronic client device 100 comprising a computer infrastructure 140 with a certain operating system 142 (e.g. Linux or any other suitable operating system) and a certain filesystem 144 (e.g. ext4).

Figure 1D:
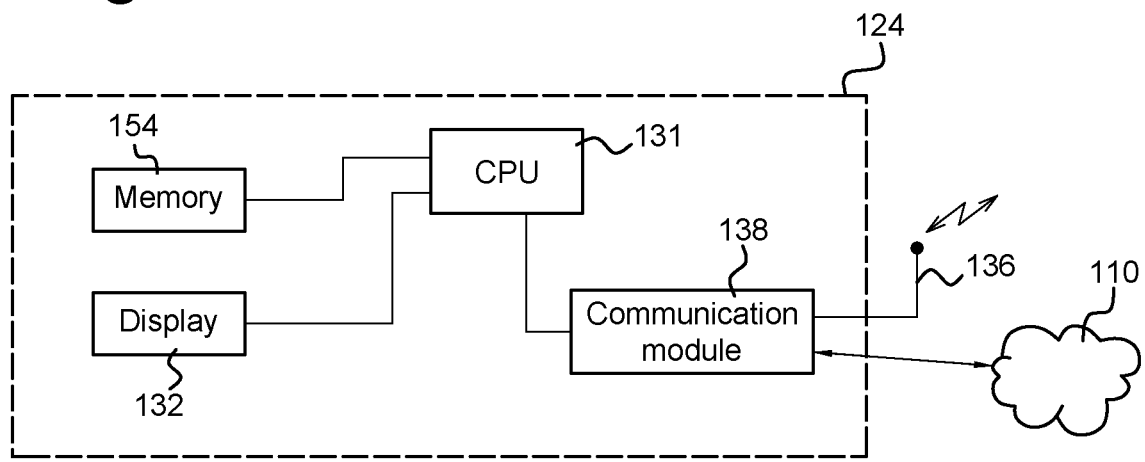
FIG. 1D shows a block diagram of an electronic server device according to an embodiment of the present disclosure.
Figure 1E:
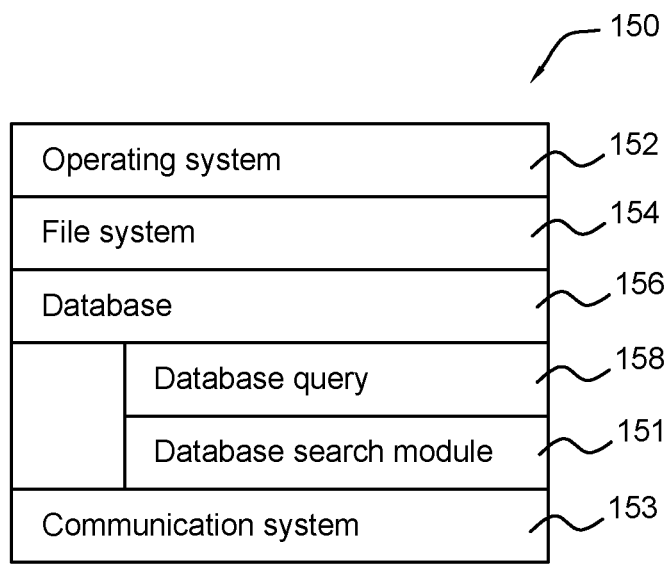
FIG. 1E shows a block diagram of a memory of the electronic server device of FIG. 1D according to an embodiment of the present disclosure.

FIG. 1E shows a block diagram of a memory of the electronic server device 124 of FIG. 1D according to an embodiment of the present disclosure.

The designs and the design characterizations are contained in a Database Management System (DBMS) 156. The DBMS 156 contains a structured representation of the data and it is able to receive queries via a database query module 158. The data in the DBMS may be represented in related tables, where each table contains a multiplicity of records and columns that can have character or numerical types. The server application 130 runs in a electronic server device 124 comprising a computer infrastructure 150 with a certain operating system 152 (e.g. Linux or any other suitable operating system) and a certain filesystem 154 (e.g. ext4). The server application 124 can send queries to the DBMS using a communication interface (eg. via a socket).

The process can be described as follows. First, the user interacts with the user interface via the user interface module 146 which comprises the filtering data procedure 148 and the plot visualization procedure 141. The user interface is graphically represented in a displaying device such as display 106 using one or several input devices such as input device 102. The interaction is the user defined input, which is then sent by the client application 140 to the server application 130 through the network 110 using communication module 151 and communication module 143. The user defined input is then translated by the server application 130 into a multiplicity of queries which are submitted to the DBMS 156 to be used by the database query module 158 and the database search module 153. The queries can be, for example, SQL queries where the tables and the parameters involved form part of the query statement in a format that is understood by the DBMS 156. The DBMS processes the queries and performs the necessary operations to collect the query results, which are then sent to the server application. The multiplicity of queries represents a filtering of the designs characterizations and the results are a set of designs and their corresponding design characterizations that fulfill the filtering requirements. The server application may perform some processing of the results using internal local memory and a set of processing commands. The processed results are then sent through the network to the client application which displays the information to the user.

Figure 2:
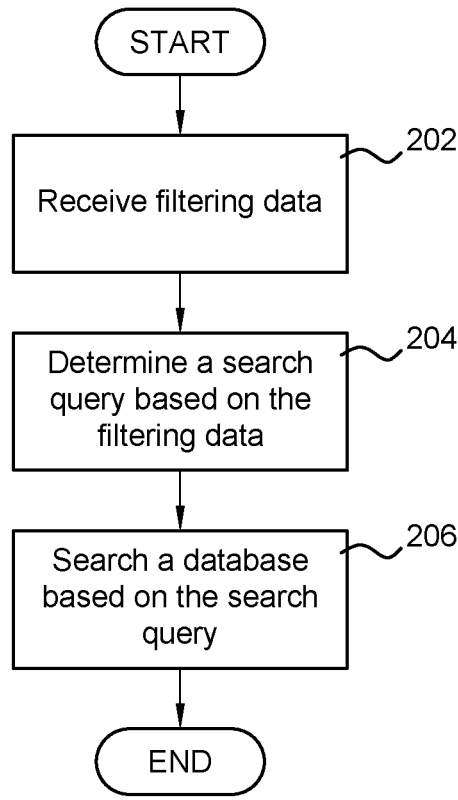
FIG. 2 shows a flow chart of a method according to an embodiment of the present disclosure.

FIG. 2 illustrates a flowchart of a filtering method used to explore and search a database according to an embodiment of the present disclosure. The filtering method of FIG. 2 comprises a first step 202 wherein filtering data is received. The filtering data may be provided by a user or may be predefined. For instance, the filtering data may be retrieved from a memory of a device or a server. The filtering data may be provided by a user via a user interface displayed on a screen of a device. The database and the user interface may be implemented in the same or in different devices. For instance, the user interface may be in a device and the database may be in a server. The device and the server may be arranged to communicate via internet or any other suitable way. The device may comprise a screen to display the user interface. The filtering data will be used to search the database. The database comprises a plurality of experimental designs.

After the filtering data is received in step 202 of FIG. 2, the received filtering data can be translated into a language understood by the database system, so that a query can be constructed. In step 204 of FIG. 2, a search query is determined based on the filtering data received in step 202. The query can be then executed by a processing unit such that the database system returns the experimental design characterizations that fulfill the filtering data. This is done in step 206 of FIG. 6, wherein the database is searched based on the search query determined in step 204.

The filtering data is a set of requirements on the experiment conditions and/or the statistical quality characteristics of the experimental designs. The set of requirements may comprise the number of 3-level factors of the experimental design (which, in the experimental design, are set at a low, average or high level), the number of 2-level factors of the experimental design (which, in the experimental design, are set at a low or a high level), the number of design runs of an experimental design, the number of center points in the design (a center point is a test of the experimental design where all 3-level factors are set at their average level), the existence of extreme points in the designs (an extreme point is a test of the experimental design where all factors are set at a low or a high level) and/or the number of replicates (a replicate occurs when there exists two or more tests in the design with the same levels for all factors). The statistical characteristics of the experimental designs may be classified in two groups: numerical statistical characteristics and categorical statistical characteristics. A numerical statistical characteristic is represented by a real number, while a categorical statistical characteristic is represented by a set of categories. The requirements on a numerical statistical characteristic may be expressed in a lower bound and/or an upper bound, wherein the lower bound of a numerical statistical characteristic represents a limitation on the minimum value of the real number representing said numerical statistical characteristic and the upper bound of a numerical statistical characteristic represents a limitation on the maximum value of the real number representing said numerical statistical characteristic. The requirements of a categorical statistical characteristic may be expressed as a selection of one or more categories of the set of categories representing said categorical statistical characteristic.

The filtering data may be one or more of the three following statistical quality criteria: projection estimation capacity, maximum third and fourth order correlation and the power to detect interaction and quadratic effects. As already said, the filtering data will be used to search a database of experimental designs. Any other statistical suitable parameter may be used to filter the database, such as for instance the average third and fourth order correlation.

The projection estimation capacity is related to the projection estimation capacity and projection information criteria of experimental designs. The statistic characteristics associated with the projection estimation capacity can be both numerical and/or categorical. The statistic characteristics of the projection estimation capacity comprise at least one of a number of projected 3-level factors, which is a numerical statistic characteristic represented by an integer, a number of projected 2-level factors, which is a numerical statistic characteristic represented by an integer, a statistical model, which is a categorical statistic characteristic represented by a limited number of categories, an average D-efficiency, which is a numerical statistic characteristic represented by a real number, an average unscaled prediction variance which is a numerical statistic characteristic represented by a real number, a G-efficiency which is a numerical statistic characteristic represented by a real number, and an average A-efficiency which is a numerical statistic characteristic represented by a real number.

Figure 3:
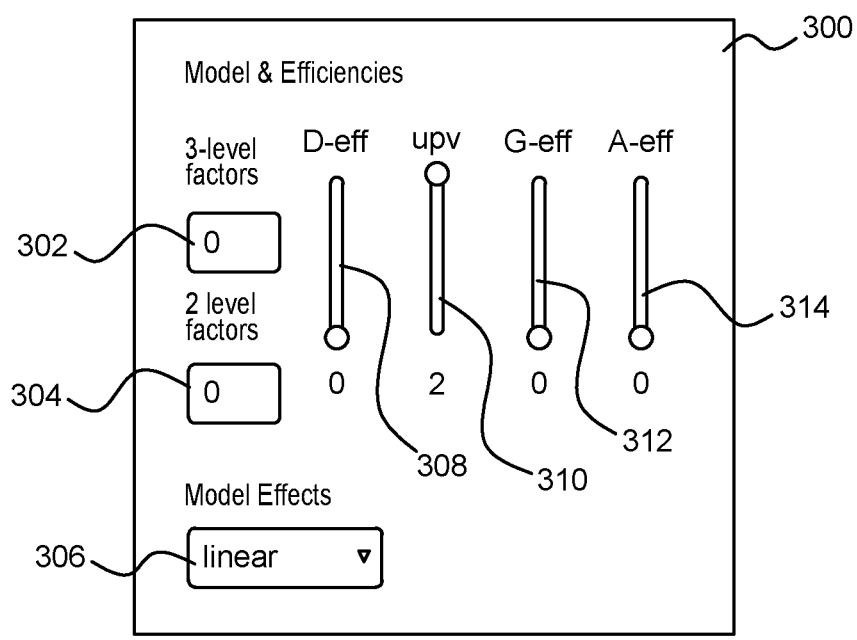
FIG. 3 shows an example of a computer implementation of a user interface to configure filtering data according with an embodiment of the invention.

FIG. 3 shows an example of a computer implementation of a user interface 300 to set the statistical characteristics wherein the statistical characteristics relate to projection estimation capacity. The user interface 300 may be displayed in a screen of a device. A user may set up 3-level factor by providing an input in an area 302 of the user interface 300. The user may set up the 2-level factor by providing an input in an area 304 of the user interface 300. The user may set up the statistical model by providing an input in an area 306 of the user interface 300. The D-efficiency, the average unscaled prediction variance, the G-efficiency and/or the A-efficiency may be set up by the user respectively through the control bars 308-314. The user interface 300 is just an example of a possible user interface allowing the user to configure filtering data. However, any other suitable way of setting the filtering data may be used in the invention. For example, instead of the control bars 308-314, corresponding areas to input values may be available for any of those statistic characteristics. Also the user interface may not comprise all the fields shown in FIG. 3 as only some of the named statistical characteristics may be used to filter the data base.

The different statistical characteristics that can be used to filter the database will be explained now. Each experimental design is stored in the database as a design matrix.

Figures 4A, 4B:
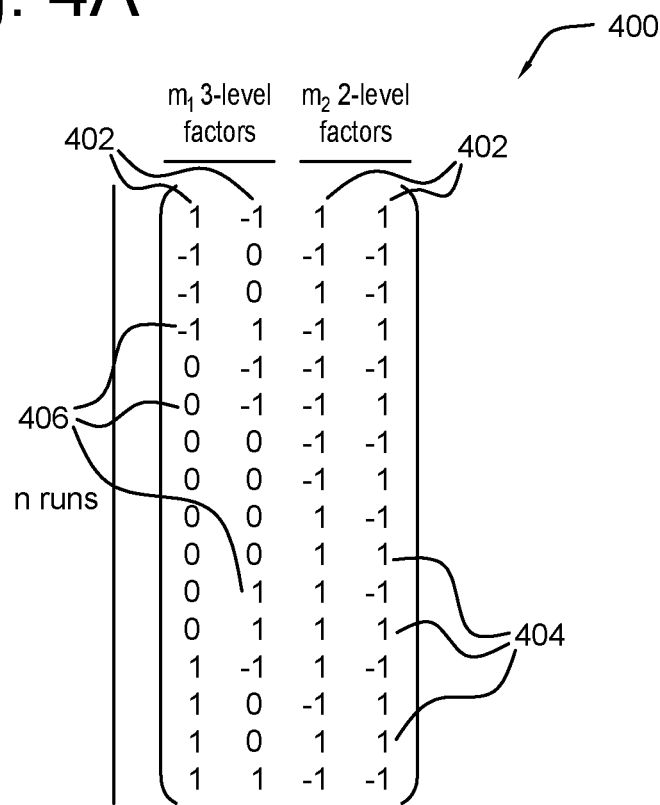

FIG. 4A shows an example of a design matrix 400 for an experimental design comprising as statistical characteristics a number $m_1$ of 3-level factors and a number $m_2$ of 2-level factors and a number n of experimental runs. In FIG. 4A, $m_1$ is equal to 2, $m_2$ is equal to 2 and n is equal to 16 such that design matrix 400 comprises 4 columns 402 wherein the first two columns correspond to the $m_1$ 3-level factors and the last two columns correspond to the $m_2$ 2-level factors. Each of the columns 402 of the design matrix 400 comprises n rows 404 corresponding to the n experimental runs of the experimental design represented by the design matrix.

Each element 406 of the first two columns of the design matrix 400 comprises a −1, a 0 or a 1 representing a 3-level factor. The 3-level factor are numerical factors, this is, factors that take values in a given closed interval. If we denote a factor as X, then the values that X can take within the experiment are included in the interval [a,b]. The three levels, −1, 0 and 1, represent, respectively, the low value, average value and high value within the interval [a,b]. This is, a factor level of −1 is equivalent to X=a, a factor level of 0 is equivalent of X=(a+b)/2 and a factor level of 1 is equivalent to X=b.

Each element 404 of the last two columns of the design matrix 400 comprises a −1 or a 1 and represents a 2-level factor. The 2-level factor are either a numerical factor that take values within the closed interval [a,b] or a categorical factor that indicates "Category A" or "Category B". If we denote a factor as X, then a factor level of −1 indicates a factor value of X=a for a numerical factor or a factor value X="Category A" for a categorical factor. A factor level of 1 indicates a factor value of X=b for a numerical factor or a factor value X="Category B" for a categorical factor. The values of the 2-level factor are divided in a first group and a second group such that the first group corresponds to the first category and the second group corresponds to the second category. In the design matrix 400 of FIG. 4A, the first category of the 2-level factor is represented by a −1 and the second category of the 2-level factor is represented by a 1. FIGS. 4B-4C and 5 show design matrices respectively for intercept and main effects, intercept, main effects and interaction effects, and intercept, main effects and second-order effects.

The goal of an experiment is to study the relation of the factors with a variable of interest, also called response. Experimental design is widely used in product development and process optimization across different industries. The statistical model provides a relation between the factors and the response, which is the outcome variable that needs to be studied. The most commonly used statistical models may include main effects, interaction effects, quadratic effects and a constant term. The main effect of a factor is based on the differences between the mean of the response variable for each unit change of the factor. The interaction effect of two factors indicates that the effect of each factor on the response depends on the other factor. The quadratic effect of a factor indicates that there is curvature in the relation between a factor and the variable of interest or response. The quadratic effects exist only for 3-level factors.

The statistical model may comprise intercept and main effects model, or intercept, main effects and interaction effects model or intercept, main effects and second-order effects. The statistical model may be any other kind of suitable statistical model. The statistical model comprising intercept and main effects is a statistical model comprising the main effects of all the factors of the experimental design and a constant term. The statistical model comprising intercept, main effects and interaction effects is a statistical model comprising the same effects as the intercept and main effects statistical model and two-factor interaction effects. The statistical model comprising intercept, main effects and second-order effects comprises the same effects as the intercept, main effects and interaction effects statistical model and quadratic effects.

As already explained, the experimental designs may be selected based on projection capacity parameters. The projection capacity parameters may be related to the projection estimation capacity and projection information capabilities of the experimental designs. An experimental design may comprise a number $m_1$ of 3-level factors, a number $m_2$ of 2-level factors and n experimental tests or runs. The experimental design may be defined by a design matrix D comprising a number m of columns, wherein m equals $(m_1+m_2)$, and n rows, such that the matrix D comprises m multiply by n elements and wherein each element of the design matrix D is a real number. Each one of the n rows of the design matrix D corresponds respectively to each one of the n experimental tests or runs, and each one of them columns of the design matrix D corresponds respectively to each one of the m factor levels of each experimental test. A design sub-matrix of the design matrix D is a design sub-matrix $D_p$ comprising a number of rows equal to n, wherein n is the number of experimental tests or runs, and comprising as columns a subset of the columns of the design matrix D such that the first $q_1$ columns of the design sub-matrix $D_p$ comprise a subset of the $m_1$ columns of the design matrix D, and the last $q_2$ columns of the design sub-matrix $D_p$ comprise a subset of the $m_2$ columns of the design matrix D such that $q_1$ is an integer number being equal or smaller than $m_1$, $q_2$ is an integer number being equal or less than $m_2$, and q is equal to $q_1+q_2$.

As already said, a statistical model α may be a model comprising intercept effects and main effects, or a model comprising intercept effects, main effects and interaction effects or a model comprising intercept effects, main effects and second-order effects.

For each considered statistical model, a model matrix for an experimental design, denoted as X, can be built based on the design matrix representing the experimental design.

For example, a design matrix for an intercept, main effects and interaction effects model can be built by taking the design matrix 500 and adding a number of columns corresponding to the interaction effects. The columns corresponding to the interaction effects can be calculated by multiplying the columns of the main effects of two factors.

A model matrix $X_{p\alpha}$ corresponding to a statistical model α may be constructed in the following ways.

If the statistical model α is a model $\alpha_1$ comprising intercept effects and main effects, then a model matrix $X_{p\alpha 1}$ of the statistical model $\alpha_1$ comprises a number of columns equal to (q+1), wherein q is the number of columns of the design sub-matrix $D_p$, and a number of rows equal to n, wherein n is the number of rows of the design sub-matrix $D_p$, where the first column of the model matrix $X_{p\alpha 1}$ is a column comprising only ones (also called the intercept column) and the second column up to the (q+1)-th column of the model matrix $X_{p\alpha 1}$ are equal respectively to the first column up to the q-th column of the design sub-matrix $D_p$.

An alternative model matrix $X'_{p\alpha 1}$ corresponding to a design matrix $D_p$ and an statistical model $\alpha_1$ may be also constructed by permutation of the columns of the model matrix $X_{p\alpha 1}$.

If the statistical model α is a model $\alpha_2$ comprising intercept, main effects and interaction effects, then a model matrix $X_{p\alpha 2}$ of the model $\alpha_2$ comprises a number of columns equal to $((q^2/2)+(q/2)+1)$, wherein q is the number of columns of the design sub-matrix $D_p$, and a number of rows is equal to n, wherein n is the number of rows of the design sub-matrix $D_p$, wherein the first column of the model matrix $X_{p\alpha 2}$ is a column comprising only ones, the second column up to the (q+1)-th column of the model matrix $X_{p\alpha 2}$ are equal respectively to the first column up to the q-th column of the design sub-matrix $D_p$, and the (q+1+i)-th column of the model matrix $X_{p\alpha 2}$ with i=1, ..., $((q*(q-1))/2)$ is determined by the element-wise multiplication of the r-th and the s-th columns of the design sub-matrix $D_p$, wherein r=floor (−0.5+square root of (0.25+(2*i))) and s=i−((r*(r+1))/2), wherein the floor function is the function that takes as input a real number x, and gives as output the greatest integer less than or equal to x.

Again, an alternative model matrix $X'_{p\alpha 2}$ corresponding to a design matrix $D_p$ and an statistical model $\alpha_2$ may be also constructed by permutation of the columns of the model matrix $X_{p\alpha 2}$.

If the statistical model α is a model $\alpha_3$ comprising intercept, main effects and second-order effects, wherein second order effects comprise interaction effects and qua-dratic effects, then the model matrix $X_{p\alpha 3}$ of the model $\alpha_3$ comprises a number of columns equal to $(q_1+(q^2/2)+(q/2)+1)$, wherein $q_1$ is the number of, wherein q is the number of columns of the design sub-matrix $D_p$, and a number of rows is equal to n, wherein n is the number of rows of the design sub-matrix $D_p$, wherein the first column up to the $((q^2/2)+(q/2)+1)$-th column of the model matrix $X_{p\alpha 3}$ are equal respectively to the first column up to the $((q^2/2)+(q/2)+1)$-th column of the model matrix $X_{p\alpha 2}$, and the $((q^2/2)+(q/2)+1+i)$-th column of the model matrix $X_{p\alpha 3}$ with i=1, ..., $q_1$ is determined by the element-wise multiplication of the i-th column of the design sub-matrix $D_p$, by itself.

As already explained, an alternative model matrix $X'_{p\alpha 3}$ corresponding to a design matrix $D_p$ and an statistical model $\alpha_3$ may be also constructed by permutation of the columns of the model matrix $X_{p\alpha 3}$.

A design with design matrix D is said to have a projection estimation capacity equal to one for a specific model α and $q_1$ 3-level factors and $q_2$ 2-level factors if all distinct $X_{p\alpha}$ constructed including all different combinations of $q_1$ 3-level factors and $q_2$ two-level factors are full rank. A full rank matrix implies that its rank equals the lesser of the number of rows and columns.

A user can set the values for $q_1$, $q_2$ and α, so that there is a query made to the database where only the designs with the projection estimation capacity equal to one for a model α and $q_1$ 3-level factors and $q_2$ 2-level factors are returned.

The D-efficiency of an experimental design for a given statistical model having a model matrix X can be calculated according to the following equation:

$$D - \text{efficiency} = 100 \cdot \frac{\det(X^T X)^{\lambda/p}}{n},$$

wherein p is the number of effects of the statistical model, i.e., p equals the number of columns of the model matrix X, $X^T$ is the transpose of the matrix X obtained by flipping the matrix X over its diagonal, and det is the determinant.

The A-efficiency of an experimental design for a given statistical model can be calculated according to the following equation:

$$A - \text{efficiency} = 100 \cdot \frac{p}{n \cdot \text{trace}((X^T X)^{-1})},$$

wherein trace is a matrix operating that adds the diagonal elements of a matrix.

The average unscaled prediction variance of an experimental design for a given statistical model can be calculated according to the following equation:

$$\text{average unscaled prediction variance} = \frac{\int_R f^T(x)(X^T X)^{-1} f(x) dx}{\int_R dx},$$

where x is a column vector of factor levels, this is, a column vector with m1+m2 entries where the first m1 entries lie inside the interval [−1,1]. The last m2 entries correspond to the two-level factors. For a categorical factor, then the corresponding entry is either −1 or 1. For a numerical two-level factor, then the corresponding entry lies in the interval [−1,1]. The function f(x) is a function that takes a vector of factor levels x and expands it to the corresponding model effects, which can include intercept, main effects, interaction effects and quadratic effects. The experimental region R consists of all possible values that a vector x can take (all combinations of the factor levels).

The G-efficiency of an experimental design for a given statistical model can be calculated according to the following equation:

$$G\text{-efficiency} = \frac{100\, p}{n \max_{x \in R} (upv_x)}$$

Wherein $upv_x$ is the unscaled prediction variance at a point defined by the vector x, and it is equal to $$upv_x = f^T(x)(X^T X)^{-1} f(x)$$

The power to detect an effect can be calculated, for instance, using the proposed method in Chapter 9 of the book Cohen, J. (1988). Statistical Power Analysis for the Behavioral Sciences (2nd ed.). Routledge, https://doi.org/10.4324/9780203771587.

The one or more items may be as well selected based on certain requirements in statistical quality characteristics of the items such as a correlation parameter of the design matrix D. The correlation parameter of the design matrix D may be based on an absolute correlation between the columns of the design matrix D. The correlation parameter of the design matrix D may comprise a maximum value of a third order correlation parameter of the design matrix D and/or a maximum value of a fourth order correlation parameter of the design matrix D. The maximum third and fourth order correlation parameters are related to the correlation between the effects in the statistical model when using a certain experimental design. There are two numerical characteristics associated with this criterion: the maximum third order correlation in absolute value between a main effect and a second-order effect, and the maximum fourth order correlation in absolute value between two second-order effects. FIG. 6 shows an example of a computer implementation of a user interface to configure filtering data according to the maximum 3rd and 4th order correlations criterion. In FIG. 6, sliding bars 602 and 604 are provided so that a user can configure maximum values for the third and fourth order correlation.

The third order correlation parameter of the design matrix D may be determined based on the maximum absolute value of the cosine similarity between any of the columns of the design matrix D and a second-order column of the design matrix D, wherein the second-order column of the design matrix D is a column vector obtained by an element-wise multiplication of two different columns of the design matrix D or by an element-wise multiplication of one column of the design matrix D with itself.

The cosine similarity of a vectors A of dimension n and a vector B of dimension n is calculated as follows:

$$\text{cosine similarity} = \frac{A \cdot B}{\|A\| \|B\|} = \frac{\sum_{i=1}^{n} A_i B_i}{\sqrt{\sum_{i=1}^{n} A_i^2} \sqrt{\sum_{i=1}^{n} B_i^2}}$$

The fourth order correlation parameter of the design matrix D may be determined based on the maximum absolute value of the cosine similarity between any two different second-order columns of the design matrix D.

The third and/or the fourth order correlation parameters can be used in a query to the database such that the database is searched based on said query. The search based on said query may return only designs having a maximum third and/or fourth correlation parameter of the design matrix D with a value less or equal to the value set by the user. The user may set up third and/or the fourth order correlation parameters by using a user interface displayed in an input unit as it is shown in FIG. 6. The third and/or the fourth order correlation parameters may be determined in any other suitable way. For instance, the third and/or the fourth order correlation parameters may be pre-stored in a memory and/or in a server. The maximum 3rd and 4th order correlations parameters are related to the correlation between the effects in the statistical model when using a certain experimental design. There are two numerical characteristics associated with this criterion: the maximum third order correlation in absolute value between a main effect and a second-order effect, and the maximum fourth order correlation in absolute value between two second-order effects. FIG. 6 shows an example of a computer implementation of a user interface to configure filtering data according to the maximum 3rd and 4th order correlations criterion.

The one or more items may be also selected based on a minimum power to detect an interaction effect or a quadratic effect. An interaction effect column of a design matrix D is defined as a column vector of n real entries that are the result of an element-wise multiplication of two distinct columns in the design matrix D. A quadratic effect column of a design matrix D is defined as a column vector of n real entries that are the result of an element-wise multiplication of a column of the design matrix D by itself.

The power of an interaction or a quadratic effect is calculated using a non-central F-distribution, considering several signal-to-noise ratios and several significance levels, considering an underlying model with intercept and main effects. A minimum power to detect an interaction effect is a minimum power across the powers to detect each distinct interaction effect column. A minimum power to detect a quadratic effect is a minimum power across the powers to detect each distinct quadratic effect column.

As explained, the power to detect interaction and quadratic effects parameters are related to the power to detect the two different types of second-order effects, namely interaction effects and quadratic effects, while using an experimental design. There are two numerical characteristics associated with this criterion: the power to detect an interaction effect and the power to detect a quadratic effect. FIG. 7 shows an example of a computer implementation of a user interface to configure filtering data according to power to detect interaction and quadratic effects criterion.

As already explained, the filtering data is received in step 202 of FIG. 2, the received filtering data can be translated into a language understood by the database system, so that a query can be constructed. In step 204 of FIG. 2, a search query is determined based on the filtering data received in step 202. The query can be then executed by a processing unit such that the database system returns the experimental design characterizations that fulfill the filtering data. This is done in step 206 of FIG. 2, wherein the database is searched based on the search query determined in step 204.

The result of the database search can be presented to a user via a user interface such a screen display in the form of, for instance, boxplots, parallel coordinate plots and/or tables.

The user can select one or several experimental designs based on the displayed information. The unique identifiers of the selected experimental designs can be stored in the memory for further processing. The user can also modify the filtering data. If this is the case, then a new query is sent to the database system. Otherwise, the unique identifiers of all selected experimental designs are saved and the filtering stage ends.

As explained, the method of FIG. 2 may be implemented in a computer device comprising a data base or in a computer system that comprises a server, a client and a database and all other necessary elements providing communications between them. This procedure or method may comprise one or more stages. The method may comprise a filtering stage. The filtering stage is performed to identify one or more items in a database comprising a plurality of design characterizations. The items may be experimental designs or any other kind of items. The one or more items may be selected based on certain requirements in statistical quality characteristics of the items. The method may also comprise a comparison stage comprising a set of graphical and numerical displays which allow a user to compare a small set of competing experimental designs.

A user can set the values of the minimum power to detect an interaction effect or a quadratic effect so that a query is made to the database and only designs with a minimum power to detect an interaction effect or a quadratic effect greater or equal than the set values are returned.

The database of design characterizations may be contained in a relational database (RDBMS), which is a system that presents the data to the user as relations in a tabular form wherein each table consists of a set of rows and columns. A column may be called a field, and a row may be called a record. The columns of the table may be of numerical or categorical type. A numerical type may be represented by a data type INTEGER, FLOAT or DECIMAL or other suitable data type. A categorical type may be represented by a data type STRING, ENUM, BOOLEAN or other suitable data type.

As a non-limiting example, the schema in FIG. 7 contains the outline of the tables used to contain the filtering criteria which has been previously described. There are two tables: a design characterizations table 702 and a projection_properties table 704.

The table design_characterizations 702 may contain 10 columns. Each column of said table 702 contains the statistic characteristics of a design. The content of the columns of the table design_characterizations 702 will be described below following the order in which said columns appear in FIG. 7, i.e., column 1 refers to the most upper column shown in the table design_characterizations 702 and column 10 to the last column of said table 702.

Column 1 corresponds to the field "id" which represents a unique identifier for each row, which is a numerical field of type INTEGER and is used to unequivocally identify each record.

Column 2 corresponds to the field "max_third_order correlation" which is a numerical field of type FLOAT which contains the value of the maximum third order correlation of the design.

Column 3 corresponds to the field "max_fourth_order_correlation" which is a numerical field of type FLOAT which contains the value of the maximum fourth order correlation of the design.

Column 4 corresponds to the field "min_power_interaction_effects"" which is a numerical field of type FLOAT which contains the value of the minimum power to detect a interaction effect.

Column 5 corresponds to the field "min_power_quadratic_effects" which is a numerical field of type FLOAT which contains the value of the minimum power to detect a quadratic effect.

Column 6 corresponds to the field "num_three_level_factors" which is a numerical field of type INTEGER which contains the value of how many three-level factors the design has. This is m1 in the patent text.

Column 7 corresponds to the field "num_two_level_factors" which is a numerical field of type INTEGER which contains the value of how many two-level factors the design has. This is m2 in the patent text.

Column 8 corresponds to the field "num_runs" which is a numerical field of type INTEGER which contains the value of how many runs or tests the design consists of.

Column 9 corresponds to the field "num_center_points" which is a numerical field of type INTEGER which contains the value of how many center points the design consists of.

Column 10 corresponds to the field "extreme_points" which is a categorical field of type BOOLEAN that takes one of the following values: "True", "False". A value of "True" indicates that the design contains one or more extreme points, while a value of "False" indicates that the design contains no extreme points.

The table projection_properties 704 contains 9 columns. Each column of this table 704 contains statistic characteristics of a design. The content of the columns of the table projection_properties 704 will be described below following the order in which said columns appear in FIG. 7, i.e., column 1 refers to the most upper column shown in the table projection_properties 704 and column 10 to the last column of said table 704.

Column 1 corresponds to the field "id. This is a unique identificatory for each row, which is a numerical field represented by an INTEGER and is used to unequivocally identify each record.

Column 2 corresponds to the field "design_characterization_id" which is a numerical field of type INTEGER which relate a record from this table to a record of design_characterizations.

Column 3 corresponds to the field "num_three_level_factors_projected" which is a numerical field of type INTEGER which contains the value of how many three-level factors have been selected from the original design. This is q1 in the patent text.

Column 4 corresponds to the field "num_two_level_factors_projected" which is a numerical field of type INTEGER which contains the value of how many two-level factors have been selected from the original design. This is q2 in the patent text.

Column 5 corresponds to the field "model" which is a categorical field of type ENUM that can take one of the following values: "meie" (main effects plus interaction effects), "mesoe" (main effects plus second order effects). This field indicates which model is considered for the calculation of the D-, A-, and G-efficiency, and the average prediction variance.

Column 6 corresponds to the field "d_efficiency" which is a numerical field of type FLOAT which contains the value of the D-efficiency for the design submatrix Dp when the model specified in Column 5 is considered.

Column 7 corresponds to the field "a_efficiency" which is a numerical field of type FLOAT which contains the value of the A-efficiency for the design submatrix Dp when the model specified in Column 5 is considered.

Column 8 corresponds to the field "g_efficiency" which is a numerical field of type FLOAT which contains the value of the G-efficiency for the design submatrix Dp when the model specified in Column 5 is considered.

Column 9 corresponds to the field "average_prediction_variance" which is a numerical field of type FLOAT which contains the value of the average prediction variance for the design submatrix Dp when the model specified in Column 5 is considered.

The relation between both tables is represented by the ⊣⋯⋯⋵ symbol

This symbol indicates that one or more records in the table projection_properties 702 are related to one record in the design_characterizations table 704.

Such a relational database as the one presented in the schema in FIG. 7 allows a user to filter the records by setting conditions on both table fields. Such a relational database may be used for searching the catalog of experimental designs. A non-limiting example of how to construct a query will be explained now.

Consider the database consisting of the following records shown in the below tables A and B wherein table A shows the design_characterizations and table B shows the projection_properties.

TABLE A example table design_characterizations with data

| id | max_third_order_correlation | max_fourth_order_correlation | min_power_interaction_effects | min_power_quadratic_effects | num_three_level_factors | num_two_level_factors | num_runs | num_center_points | extreme_points |
|---|---|---|---|---|---|---|---|---|---|
| 1 | 0 | 0.167 | 0.43 | 0.38 | 3 | 0 | 14 | 2 | FALSE |
| 2 | 0 | 0 | 0.45 | 0.45 | 3 | 0 | 16 | 4 | FALSE |

TABLE B example table projection_properties with data

| id | design_characterization_id | num_three_level_factors_projected | num_two_level_factors_projected | model | d_efficiency | a_efficiency | g_efficiency | average_prediction_variance |
|---|---|---|---|---|---|---|---|---|
| 1 | 1 | 1 | 0 | meie | 75.59 | 72.72 | 72.72 | 0.111 |
| 2 | 1 | 1 | 0 | mesoe | 51.92 | 36.73 | 85.71 | 0.156 |
| 3 | 1 | 2 | 0 | meie | 55.27 | 50 | 50 | 0.185 |
| 4 | 1 | 2 | 0 | mesoe | 41.94 | 30.61 | 61.22 | 0.281 |
| 5 | 1 | 3 | 0 | meie | 45.99 | 41.79 | 41.79 | 0.281 |
| 6 | 1 | 3 | 0 | mesoe | 37.7 | 27.87 | 49.69 | 0.44 |
| 7 | 2 | 1 | 0 | meie | 70.71 | 66.67 | 66.67 | 0.104 |
| 8 | 2 | 1 | 0 | mesoe | 50 | 37.5 | 75 | 0.134 |
| 9 | 2 | 2 | 0 | meie | 50 | 44.44 | 44.44 | 0.178 |
| 10 | 2 | 2 | 0 | mesoe | 39.69 | 31.58 | 54.54 | 0.239 |
| 11 | 2 | 3 | 0 | meie | 41.02 | 36.84 | 36.84 | 0.275 |
| 12 | 2 | 3 | 0 | mesoe | 35.36 | 29.41 | 45.45 | 0.36 |

In order to retrieve the id, the maximum fourth order correlation, and the number of runs of the designs with 3 three-level factors and 0 two-level factors, with a number of runs less or equal than 16 and a D-efficiency for a model with main effects and second order effects (coded as "mesoe") of at least 50, following query, for instance in SQL language may be built:
"SELECT t1.id, t1.max_fourth_order_correlation, t1.num_runs FROM design_characaterizations t1
INNER JOIN projection_properties t2 ON t1.id=t2.design_characterization_id
WHERE t1.n_three_level_factors=3 AND t1.n_two_level_factors=0 AND t1.n_runs<=16 AND t2.model='mesoe' AND t2.d_efficiency>=50 AND t2.num_three_level_factors_projected=3"

And the results obtained by performing the above query are shown in a table format in the below table C.

TABLE C table with the results of the example query

| id | max_fourth_order_correlation | num_runs |
|---|---|---|
| 1 | 0.167 | 14 |

A visual method to select an item among a plurality of items based on ternary plots will be explained now.

FIG. 8 shows a ternary plot 800. A ternary plot 800 is a two-dimensional barycentric plot on three variables that sum to a constant. A ternary plot is also called a simplex plot, a ternary graph, a triangle plot and a Gibbs triangle. In the case of the present invention, the ternary plot is used to display on a screen and rank a set of items which are characterized by three numerical attributes or parameters. The characterization of each item may contain more than three numerical attributes or parameters. In the following, items comprising three attributes or parameters will be considered. However, everything that will be described can be applied to items comprising any number of attributes or parameters. If the items comprise more than three attributes or parameters, then three of them will be selected and then method will continue as explained above.

In a ternary plot, the proportion of the three numerical parameters or attributes sum up to some constant number K. The numerical parameters or attributes will be denoted by the letters a, b and c in the rest of the present disclosure. The three proportions or weights of each of the numerical attributes or parameters will be denoted respectively with the symbols $w_a$, $w_b$ and $w_c$. Each of the three weights $w_a$, $w_b$ and $w_c$ are non-negative real numbers. The sum of the three weights $w_a$, $w_b$ and $w_c$ is equal to one. The set of the three weights ($w_a$, $w_b$, $w_c$) represent a weight point. For example, in FIG. 8, the weights point (0,0,1), (1,0,0) and (0,1,0) are respectively located at the first corner 802, the second corner 804 and the third corner 806 of the ternary plot 800. The weights points (1/2, 1/2,0), (0,1/2,1/2) and (1/2,0,1/2) are respectively located at the center of each one of the edges 812, 814, 810 of the ternary plot 800. Finally, the weight point (1/3,1/3,1/3) is the center of gravity 816 of the ternary plot 800. Each numerical parameter or attribute comprises a direction of improvement, which can be of two types. The first type of direction of improvement comprises a numerical parameter that improves as the value of the numerical parameter increases. The second type comprises a numerical attribute that improves as the value of the numerical parameter decreases.

FIG. 9 shows a flow chart of a method to determine vertex, edge and internal points in a plot ternary according to an embodiment of the invention. In a step 902 of FIG. 9, an input indicating a plurality of items characterized by three numerical attributes is received. The input may be received via the user interface 102 of the electronic device shown in FIG. 1A. The plurality of items may be stored in the memory 102 of the electronic device shown in FIG. 1A. However, the plurality of items may be stored in a database of a server device as the one shown in FIG. 1B and the processing unit 101 of the client electronic device of FIG. 1B may be arrange to send a signal via the communication module 108 to the server device of FIG. 1B wherein the sent signal is based on the received input. Each item of the plurality of items is characterized by a set of three numerical attributes which comprises a first parameter a, a second parameter b and a third parameter c. Each of the first parameter a, the second parameter b and the third parameter c of an item of the plurality of items comprises a numerical value based on an attribute or property of the corresponding item. The attribute or property may be the third order correlation parameter, the fourth order correlation parameter, the power to detect an interaction effect or a quadratic effect, the D- A- or G-efficiency for a given statistical model, the average unscaled prediction variance for a given model or the projection estimation capacity parameters of a design. Each of the first parameter, the second parameter and/or the third parameter may be a parameter for which an item of the plurality of items comprising a first parameter, a second parameter and/or a third parameter having respectively a numerical value higher than the first parameter, the second parameter and/or the third parameter of another item of the plurality of items is preferred. In the same way, Each of the first parameter, the second parameter and/or the third parameter may be a parameter for which an item of the plurality of items comprising a first parameter having a numerical value lower than the first parameter of another item of the plurality of items is preferred.

In step 904 of FIG. 9, vertices, edges and interior points of a ternary plot are calculated and stored. For instance, in order to obtain an edge point, a pair of items among the plurality of items is selected. The selection of the pair of items may be performed by the processing unit 101 of the electronic device shown in FIG. 1A or may be performed by the processing unit of the server device 124. If the selection of the pair of items is performed by the processing unit of the server device 124, the selection of the pair of items is sent to the communication module 108 of the client device 100. The selected pair of items comprises a first item and a second item wherein the first item and the second item comprise each one a first, a second and a third parameter. Then, two parameters among the first, the second and the third parameters are selected by the processing unit 101 and a first weight value and a second weight value is determined by the processing unit 101 for the selected pair of items, wherein the first weight value is determined based on the first parameter and the second parameter of each item of the pair of items and the second weight value is determined based on the first parameter and the second parameter of each item of the pair of items. Finally, the determined first weight value and second weight value of the pair of items are stored in the memory as an edge point of the ternary plot. The determining and storing steps may be performed for each pair of items of the plurality of items. The internal points of the ternary plot are calculated in a similar way by selecting three items instead of two and calculating the corresponding weights for said three items and the first, the second and the third parameters.

The step 904 of the method of FIG. 9 may comprise determining, at the operating system, points at the vertices by obtaining and storing a first vertex point, a second vertex point and a third vertex point, wherein the first vertex point corresponds to the item of the set of items comprising the greatest first parameter value among the first parameter values of the plurality of values, the second vertex point corresponds to the item of the set of items comprising the greatest second parameter value among the second parameter values of the plurality of items, and the third vertex point corresponds to the item of the set of items comprising the greatest third parameter value among the third parameter values of the plurality of items.

Further examples and details about how to obtain the vertices, edges and internal points of the ternary plot will be provided later on.

Each of the first, second and third parameters may further comprise a direction value. The method of FIG. 9 may further comprise a step (performed after step 902) of transforming the first, second and third parameters of the set of items. The transformation is based on the directions of the first, second and third parameters and may comprise performing a sign change operation of the first, second and/or third parameters of at least one item of the set of items. The direction value of a parameter indicates one of two directions of improvement for said parameter and performing the transformation of the parameter based on the direction comprises performing the transformation if the direction value indicates a determined direction of improvement.

Step 906 of FIG. 9 may further comprise discarding the stored points based on a score value of the items, wherein the score value of an item is calculated as a linear combination of the first weight, the second weight and the third weight of the item. In step 906 it can be decided whether to discard a stored point based on the calculated score value. The decision to whether to discard a stored point can be based on a comparison between the score values of the different items wherein the stored points not having a maximum score may be discarded. Further details of step 906 will be provided later on.

Finally, the method of FIG. 9 may comprise step 908 wherein the obtaining ternary plot points are returned to display in the display of the computer device, a ternary plot based on the stored vertices, edge and internal points.

FIG. 10 shows a flow chart of a method to determine the edge points in a plot ternary according to an embodiment of the invention.

In step 1002 of FIG. 10, a weight value $w_a$ and a weight value $w_b$ are determined by the processing unit 101 for a selected pair of items comprising an item i and an item j, according to the following system of equations:

$$(w_a * a_i) + (w_b * b_i) = (w_a * a_j) + (w_b * b_j);$$

$$w_a + w_b = 1;$$

wherein $a_i$ is the first parameter of item i, $b_i$ is the second parameter of item i, $a_j$ is the first parameter of item j, and $b_j$ is the second parameter of item j.

In step 1004, if $w_a$ and $w_b$ are both greater than zero, the method proceeds further to step 1006 wherein $w_a$ and $w_b$ are stored as weights of the items i and j, for instance in the form of pairs $\{[(w_a, w_b, 0), i], [(w_a, w_b, 0), j]\}$. If in step 1004, $w_a$ and $w_b$ are not both greater than zero, the method proceeds to step 1008.

In step 1008 of FIG. 10, a weight value $w_a$ and a weight value $w_c$ are determined by the processing unit 101 for the selected pair of items comprising an item i and an item j, according to the following system of equations:

$$(w_a * a_i) + (w_c * c_i) = (w_a * a_j) + (w_c * c_j);$$

$$w_a + w_c = 1;$$

In step 1010, if $w_a$ and $w_c$ are both greater than zero, the method proceeds further to step 1012 wherein $w_a$, and $w_c$, are stored as weights of the items i and j, for instance in the form of pairs $\{[(w_a, 0, w_c), i], [(w_a, 0, w_c), j]\}$. If, in step 1014, $w_a$ and $w_c$ are not both greater than zero, the method proceeds to step 1014.

In step 1014 of FIG. 10, a weight value $w_b$ and a weight value $w_c$ are determined by the processing unit 101 for the selected pair of items comprising an item i and an item j, according to the following system of equations:

$$(w_b * b_i) + (w_c * c_i) = (w_b * b_j) + (w_c * c_j);$$

$$w_b + w_c = 1;$$

In step 1016, if $w_b$ and $w_c$ are both greater than zero, the method proceeds further to step 1018 wherein $w_b$ and $w_c$ are stored as weights of the items i and j, for instance in the form of pairs $\{[(0, w_b, w_c), i], [(0, w_b, w_c), j]\}$. If, in step 1014, $w_b$ and $w_c$ are not both greater than zero, the method ends.

The method described in FIG. 10 is repeated for every pair of items of a selected plurality of items.

FIG. 11 shows a flow chart of a method to determine the internal points in a plot ternary according to an embodiment of the invention.

In step 1102 of FIG. 11, a weight value $w_a$, a weight value $w_b$, and a weight value $w_c$ are determined by the processing unit 101 for a set of three comprising an item i, an item j and an item k, according to the following system of equations:

$$(w_a * a_i) + (w_b * b_i) + (w_c * c_i) = (w_a * a_j) + (w_b * b_j) + (w_c * c_j);$$

$$(w_a * a_i) + (w_b * b_i) + (w_c * c_i) = (w_a * a_k) + (w_b * b_k) + (w_c * c_k);$$

$$w_a + w_b + w_c = 1;$$

wherein $a_i$ is the first parameter of item i, $b_i$ is the second parameter of item i, $c_i$ is the third parameter of item i, $a_j$ is the first parameter of item j, $b_j$ is the second parameter of item j, and $c_j$ is the second parameter of item j, and $a_k$ is the first parameter of item k, $b_k$ is the second parameter of item k, and $c_k$ is the second parameter of item k.

In step 1104, if $w_a$, $w_b$ and $w_c$ are all greater than zero, the method proceeds further to step 1106 wherein $w_a$, $w_b$ and $w_c$ are stored as weights of the items i, j and k, for instance in the form of $\{[(w_a, w_b, w_c), i], [(w_a, w_b, w_c), j], [(w_a, w_b, w_c), k]\}$. If in step 1104, $w_a$, $w_b$ and $w_c$ are not all greater than zero, the method ends.

The method described in FIG. 11 is repeated for every group of three items of a selected plurality of items.

Regarding the methods described with respect to FIGS. 9, 10 and 11, if any of the system of equations for a pair of items i and j or for a group of items i, j, and k, is underdetermined (this is, has infinite number of solutions) the pair of items i and j or the group of items i, j, and k is skipped and the next pair or group of distinct items is considered.

The method described with respect to FIGS. 9, 10 and 11 may comprise a further step wherein each saved weights points and associated item of the form $\{i, (w_a, w_b, w_c)\}$ is used to calculate a score value $s_i = (w_a * a_i) + (w_b * b_i) + (w_c * c_i)$. Each item j distinct from item i is considered such that a score for the item j is calculated as $s_j = (w_a * a_j) + (w_b * b_j) + (w_c * c_j)$. If $s_j$ is greater than $s_i$, then the set of weights point and associated item i of the form $\{i, (w_a, w_b, w_c)\}$ is no longer considered in further calculations.

Furthermore, the methods described with respect to FIGS. 9, 10 and 11 may comprise a further step wherein the item or items with the highest value a parameter a is identified and the weights point (1,0,0) associated with the item or items identified is saved for later processing. Then, the item or items with the highest value for the attribute b is identified and the weights point (0,1,0) associated with the item or items identified is saved for later processing. Finally, the item or items with the highest value for the attribute c is identified and the weights point (0,0,1) associated with the item or items identified is saved for later processing.

The saved weights points and the associated items contain all necessary information to produce the ternary plot object of the present disclosure. Multi-attribute decision making (MADM) refers to making preference decisions (such as evaluation, prioritization, selection) over the available alternatives that are characterized by multiple, usually conflicting, attributes. An example of MADM can be found in "Multiple criteria decision support software", 2005, by Weistroffer, H. R., Smith, C. H., and Narula, S. C. or in "Multiple Criteria Decision Analysis: State of the Art Surveys, International Series in Operations Research & Management Science", by In Figueira, J., Greco, S., and Ehrgott, M., editors, Springer.

It is important to note that the number of available alternatives is finite.

FIG. 12 shows a ternary plot 1200 according to an embodiment of the invention, wherein each region 1202-1207 indicates which item(s) is (are) more optimal for a given set of weights $(w_a, w_b, w_c)$ such that $w_a + w_b + w_c = 1$. A generic set of weights $(w_a, w_b, w_c)$ corresponds to a point in the triangle given by $(w_a/W, w_b/W, w_c/W)$, where $W = w_a + w_b + w_c$.

The vertex points and the points that define the regions in the ternary plot 1200 of FIG. 12 are based on the weights stored in the methods of FIGS. 10 and 11. The input of said methods is a set of n items characterized by three numerical attributes a, b and c. As already explained, the output of said methods is a set of pairs P wherein the first element is an item and the second a tuple of weights $(w_a, w_b, w_c)$, which represent the vertices of the polygons forming regions 1202-1207 in the ternary plot 1200. In the ternary plot 1200, a point can be located at the edges 1223-1225, inside the triangle or at a triangle vertex 1220-1222. The edge points 1230 in the plot ternary 1200 can be calculated according to the method described in relation to FIG. 10. The internal points 1240 in the plot ternary 1200 can be calculated according to the method described in relation to FIG. 11. Above it has been described how to determine the vertex points 1220-1222. The ternary plot 1200 can be displayed by the processing unit 101 on the display 106. A user can then select a determined item in the different regions of the plot depending on the preferred parameter. An example wherein some of the previously explained embodiments of the invention are applied will be now described for designing an experiment to study the impact of 3-level factor settings of the production process of a product on the number of impurities in the product. The 3-level factors that will be taken into consideration are the concentration of Natrium-Chloride (NaCl), the dilution time, and the temperature of the process. A company may desire to conduct experiments to optimize the settings of these three 3-level factors.

First it will be explained how to filter a database of experimental designs and then it will be explained how to construct a ternary plot showing experimental designs.

The allocated budget allows for a number n of experimental tests or runs between 16 and 20. In this case, due to the high price of each experimental test (in materials, manpower and time), it is desired that the number of experimental tests is as low as possible. On the other hand, the experimental designs should have high quality meaning that strict requirements for the design statistical quality characteristics should be imposed. These requirements consist in certain thresholds imposed in the following statistical quality characteristics: the fourth order correlation, the power to detect an interaction effect, the power to detect a quadratic effect and the G-efficiency for a design model with intercept, main effects, interaction effects and quadratic effects.

To this end, a pharmaceutical company may use a software program to access a database comprising a catalog of experimental designs by performing a query to filter the database records that fulfil the specified requirements. These requirements may be as follows:
  Number of three-level factors: 3
  Number of experimental tests or runs: between 16 and 20
  Fourth order correlation <=0.55
  Power to detect an interaction effect >=0.5
  Power to detect a quadratic effect >=0.5
  G-efficiency for a model with intercept, main effects, interaction effects and quadratic effects >=40

These requirements may be provided by a user through, for instance, a User Interface displayed on a display 106 of an electronic device 100. FIG. 13 shows an embodiment of user interfaces similar to the ones shown in FIGS. 3, 6 and 7 wherein these requirements have been introduced by a user.

The requirements are then sent by the client application 140 of the electronic device 100 via the communication module 108 through network 110 to the server application 130 via the communication module of another electronic device 124 which communicates with the DBMS 156 to obtain data representing the experimental designs complying with the mentioned requirements. The server application 130 may perform some processing of the data representing the experimental designs and send it through the network 110 to the client application 100 which may display the data representing the experimental designs in the display 106 of the electronic device 100.

It will be explained now an example of how to display the data representing the experimental designs in the display 106 of the electronic device 100. The results of the query may comprise data representing four experimental designs, each one being characterized using the five different statistical quality characterizations specified before. The data is displayed in Table 1, wherein the first column shows a design number used to identify each one of the experimental designs stored in the DBMS 156.

TABLE 1 results of the filtering of the DBMS

| design number | number of tests | 4th order correlation | power interaction | power quadratic | G-efficiency for a model with intercept, main effects and second order effects |
|---|---|---|---|---|---|
| 60 | 16 | 0 | 0.5223 | 0.5223 | 45.45 |
| 2033 | 17 | 0.514 | 0.8005 | 0.5424 | 40.63 |
| 9226 | 18 | 0.298 | 0.8076 | 0.5424 | 71.11 |
| 9227 | 20 | 0.167 | 0.8184 | 0.6218 | 66.67 |

The direction of improvement of each of the different statistical quality characterizations is as follows:
  Number of experimental tests or runs: lower values are preferred
  $4^{th}$ order correlation: lower values are preferred
  Power interaction effects: higher values are preferred
  Power quadratic effects: higher values are preferred
  G-efficiency: higher values are preferred Given these directions of improvement, the following transformation is applied to some of the columns in Table 1. The columns that are transformed are those corresponding to statistical quality parameters for which lower values are preferred, this is, the second and third columns which correspond respectively to the number of experimental tests or runs and the $4^{th}$ order correlation. The transformation consists in multiplying all values in those columns by −1. Table 2 shows the data of table 1 after applying this transformation.

TABLE 2 results after applying the directions of improvements

| design number | Number of tests | 4th order correlation | power interaction | power quadratic | G-efficiency for a model with intercept, main effects and second order effects |
|---|---|---|---|---|---|
| 60 | −16 | 0 | 0.5223 | 0.5223 | 45.45 |
| 2033 | −17 | −0.514 | 0.8005 | 0.5424 | 40.63 |
| 9226 | −18 | −0.298 | 0.8076 | 0.5424 | 71.11 |
| 9227 | −20 | −0.167 | 0.8184 | 0.6218 | 66.67 |

As already explained, a pharmaceutical company may consider that the most important statistical quality characteristics to select experimental designs are the number of experimental tests or runs, the $4^{th}$ order correlation and the power to detect interaction effects. The method presented now applied to this example allows an efficient construction of a ternary plot, where a plurality of selected items or experimental designs can be compared to each other based on different attributes such as the above specified statistical quality characteristics in order to select them.

FIG. 14 shows a ternary plot, where the three statistical quality characteristics are placed one at each vertex. Vertex 1 is the bottom left vertex of the ternary plot shown in FIG. 14 and corresponds to the number of experimental tests or runs, vertex 2 is the bottom right vertex of the ternary plot shown in FIG. 14 and corresponds to the $4^{th}$ order correlation, and vertex 3 is the upper vertex of the ternary plot shown in FIG. 14 and corresponds to the power interaction.

To avoid numerical issues in the calculations that follow, the statistical quality characteristics of interest in Table 2 will be normalized, so that the values of said statistical quality characteristics lie between 0 and 1. Table 3 shows the same columns as table 2 after normalization. In table 3, the statistical quality characteristics have been renamed as a which is the number of experimental tests or runs, b which is the 4th order correlation, and c which is the power interaction.

From now on we will refer to the statistical quality characteristics as attributes. The design numbers of tables 1 and 2 are called items in table 3 and designs 60, 2033, 9226 and 9227 of tables 1 and 2 have been relabeled respectively as item 1, item 2, item 3 and item 4. This is just a notation used to allow more easily to explain the example. We use the notation $a_1$ to refer to the value of attribute a for item 1, this is, $a_1=1$, and so on for the other items and corresponding attributes. I.e, each item i has associated three attribute values $a_i$, $b_i$ and $c_i$ corresponding respectively to the statistical quality characteristics number of experimental tests or runs, the $4^{th}$ order correlation and the power to detect interaction effects, and wherein i=1 . . . 4.

TABLE 3 results after applying the directions of improvements and normalization

| item | a | b | c |
|---|---|---|---|
| 1 | 1 | 1 | 0 |
| 2 | 0.75 | 0 | 0.9395 |
| 3 | 0.5 | 0.4202 | 0.9635 |
| 4 | 0 | 0.6751 | 1 |

We define the score of an item i for a certain set of weights of the attributes $w_a$, $w_b$ and $w_c$ as:

$$score_i = w_a * a_i + w_b * b_i + w_c * c_i$$

The weights $w_a$, $w_b$ and $w_c$ correspond to a point in the ternary plot of FIG. 14 with coordinates $(w_a, w_b, w_c)$.

The calculation of the points in the ternary plot is performed by a processing unit such as CPU 102 of the electronic device 100 shown in FIG. 1A and is divided in three steps. First, the items at the vertices of the ternary plot 1500 are calculated. Second, the existing breaking points at the edges 1502, 1504 and 1506 of the ternary plot 1500 are obtained (here a point will have two items associated). Finally, the internal points of the ternary plot 1500 are calculated (for which three items are associated). At each step, the weights (ternary plot coordinates) and the obtained items will be stored.

As already said, in the first step, the items corresponding to the vertex points vertex 1, vertex 2 and vertex 3 of the ternary plot 1500 will be calculated as follows. For each vertex, the item with a higher score when using the weights corresponding to the coordinates in the ternary plot of said vertex is calculated by CPU 101 in the following way:

For vertex 1 having coordinates in the ternary plot $(w_a, w_b, w_c)=(1,0,0)$, only the attribute a (number of experimental tests) of each item is taken into account and therefore from table 3 the following scores are calculated for the different items: $score_1=1$, $score_2=0.75$, $score_3=0.5$, $score_4=0$. As the highest score is $score_1=1$, the pair or weights and item $\{[(1,0,0), 1]\}$ is stored in memory 104.

For vertex 2 with coordinates (0,1,0), we will consider the attribute b of each item and therefore we obtain from table 3 the following scores for the different items: $score_1=1$, $score_2=0$, $score_3=0.4202$, $score_4=0.6751$. As the highest score is $score_1=1$, the pair or weights and item $\{[(0,1,0), 1]\}$ is stored in memory 104.

For vertex 3 with coordinates (0,0,1), we will consider the attribute c of each item and therefore we obtain from table 3 the following scores for the different items: $score_1=0$, $score_2=0.9395$, $score_3=0.9635$, $score_4=1$. As the highest score is $score_4=1$, the pair or weights and item $\{[(0,0,1), 4]\}$ is stored in memory 104.

In the second step, the edge points will be calculated by CPU 101. To obtain the breaking points on each edge 1502, 1504 and 1506 (line between two vertex in the ternary plot) CPU 101 iterates through all the pairs of items. For each pair of items three different systems of linear equations are solved by CPU 101, one for each edge 1502, 1504 and 1506 of the ternary plot 1500.

As there are four items, there are six different pairs of distinct items. In what follows, we detail the calculations for all pairs and all edges.

First we consider the pair 1 comprising items 1 and 2.

For this pair 1, we will start finding the edge points on the edge 1502 connecting vertex 1 and vertex 2. The following system of linear equations with two variables and two equations is solved to obtain the weights of potential points in this edge 1502 by CPU 101:

$$w_a * a_1 + w_b * b_1 = w_a * a_2 + w_b * b_2$$

$$w_a + w_b = 1.$$

Using the values for the item attributes displayed in Table 3, the above system of equations becomes:

$$w_a + w_b = w_a * 0.75$$

$$w_a + w_b = 1$$

The solution to this system is $w_a=1.33$ and $w_b=-0.33$. As $w_b<0$, this set of weights is discarded by CPU 101 and no edge point is stored for edge 1502.

Edge 1504 connecting vertex 1 and vertex 3 is considered now. The following system of linear equations with two variables and two equations is solved by CPU 101 to obtain the weights of potential points in this edge 1504:

$$w_a * a_1 + w_c * c_1 = w_a * a_2 + w_c * c_2$$

$$w_a + w_b = 1$$

Using the values for the item attributes displayed in Table 3, this system of equations becomes:

$$w_a + w_c = w_a * 0.75 + w_c * 0.9395$$

$$w_a + w_c = 1$$

The solution to this system is $w_a=0.79$ and $w_c=0.21$. Because $w_a>0$ and $w_c>0$ then w the following pairs of weights and items is stored in memory 104: $\{[(0.79, 0, 0.21), 1], [(0.79, 0, 0.21), 2]\}$.

Next, edge 1506 between vertex 2 and vertex 3 is considered. The following system of linear equations with two variables and two equations is solved by CPU 101 to obtain the weights of potential points in this edge:

$$w_b * b_1 + w_c * c_1 = w_b * + w_c * c_2$$

$$w_b + w_c = 1$$

Using the values for the item attributes displayed in Table 3, this system of equations becomes:

$$w_b = w_c * 0.9395$$

$$w_b + w_c = 1$$

The solution to this system is $w_b = 0.48$ and $w_c = 0.52$. As $w_b > 0$ and $w_c > 0$, the following pairs of weights and items are stored in memory 104: {[(0, 0.48, 0.52), 1], [(0, 0.48, 0.52), 2]}

Now a second pair 2 comprising items 1 and 3 is considered.

For this pair 2, again the edge points on the edge 1502 connecting vertex 1 and vertex 2 are calculated by the CPU 101.

Using the values for the item attributes displayed in Table 3, the following system of linear equations with two variables and two equations is solved by CPU 101 to obtain the weights of potential points in this edge 1502:

$$w_a + w_b = w_a * 0.5 + w_b * 0.4202$$

$$w_a + w_b = 1$$

The solution to this system is $w_a = 7.26$ and $w_b = -6.26$. As $w_b < 0$, this set of weights is discarded by CPU 101 and no edge point is calculated for edge 1502.

Next, edge 1504 between vertex 1 and vertex 3 is considered. Using the values for the item attributes displayed in Table 3, the following system of linear equations with two variables and two equations is solved by CPU 101 to obtain the weights of potential points in this edge 1504:

$$w_a = w_a * 0.5 + w_c * 0.9635$$

$$w_a + w_c = 1$$

The solution to this system is $w_a = -0.08$ and $w_c = 1.08$. As $w_a < 0$, this set of weights is discarded by CPU 101.

When considering edge 1506 between vertex 2 and vertex 3, the following system of linear equations with two variables and two equations is solved by CPU 101 to obtain the weights of potential points in this edge 1506:

$$w_b = w_b * 0.4202 + w_c * 0.9635$$

$$w_b + w_c = 1$$

The solution to this system is $w_b = 0.62$ and $w_c = 0.38$. As $w_b > 0$ and $w_c > 0$, the following pairs of weights and items are stored in memory 104: {[(0, 0.62, 0.38), 1], [(0, 0.62, 0.38), 3]}.

Now a third pair 3 comprising items 1 and 4 is considered.

For this pair 3, again the edge points on the edge 1502 connecting vertex 1 and vertex 2 are calculated by the CPU 101.

Using the values for the item attributes displayed in Table 3, the following system of linear equations with two variables and two equations is solved by CPU 101 to obtain the weights of potential points in this edge 1502:

$$w_a + w_b = w_b * 0.6751$$

$$w_a + w_b = 1$$

The solution to this system is $w_a = -0.48$ and $w_b = 1.48$. As $w_a < 0$, these values are discarded.

The edge points on the edge 1504 are calculated by the CPU 101 now.

Using the values for the item attributes displayed in Table 3, the following system of linear equations with two variables and two equations is solved by CPU 101 to obtain the weights of potential points in this edge 1504:

$$w_a = w_c$$

$$w_a + w_c = 1$$

The solution to this system is $w_a = 0.5$ and $w_c = 0.5$. As $w_c > 0$ and $w_a > 0$, the following pairs of weights and items are stored in memory 104: {[(0.5, 0, 0.5), 1], [(0.5, 0, 0.5), 4]}.

Next, edge 1506 between vertex 2 and vertex 3 is considered. The following system of linear equations with two variables and two equations is solved by CPU 101 to obtain the weights of potential points in this edge 1506:

$$w_b = w_b * 0.6751 + w_c$$

$$w_b + w_c = 1$$

The solution to this system is $w_b = 0.75$ and $w_c = 0.25$. As $w_b > 0$ and $w_c > 0$, the following pairs of weights and items are stored in memory 104: {[(0, 0.75, 0.25), 1], [(0, 0.75, 0.25), 4]}.

Now a fourth pair 4 comprising items 2 and 3 is considered.

For this pair 4, again the edge points on the edge 1502 connecting vertex 1 and vertex 2 are calculated by the CPU 101.

Using the values for the item attributes displayed in Table 3, the following system of linear equations with two variables and two equations is solved by CPU 101 to obtain the weights of potential points in this edge 1502:

$$w_a * 0.75 = w_a * 0.5 + w_b * 0.4202$$

$$w_a + w_b = 1$$

The solution to this system is $w_a = 0.63$ and $w_b = 0.37$. As $w_b < 0$. As $w_a > 0$ and $w_c > 0$, the following pairs of weights and items are stored in memory 104: {[(0.63, 0.37, 0), 2], [(0.63, 0.37, 0), 3]}.

The edge points on the edge 1504 are calculated by the CPU 101 now. Using the values for the item attributes displayed in Table 3, the following system of linear equations with two variables and two equations is solved by CPU 101 to obtain the weights of potential points in this edge 1504:

$$w_a * 0.75 + w_c * 0.9395 = w_a * 0.5 + w_c * 0.9635$$

$$w_a + w_c = 1$$

The solution to this system is $w_a = 0.09$ and $w_c = 0.91$. As $w_c > 0$ and $w_a > 0$, the following pairs of weights and items are stored in memory 104: {[(0.09, 0, 0.91), 2], [(0.09, 0, 0.91), 3]}.

Next, edge 1506 between vertex 2 and vertex 3 is considered. The following system of linear equations with two variables and two equations is solved by CPU 101 to obtain the weights of potential points in this edge 1506:

$$w_c * 0.9395 = w_b * 0.4202 + w_c * 0.9635$$

$$w_b + w_c = 1$$

The solution to this system is $w_b = -0.06$ and $w_c = 1.06$. As $w_b < 0$ these weights are discarded.

Now a fifth pair 5 comprising items 2 and 4 is considered.

For this pair 5, again the edge points on the edge 1502 connecting vertex 1 and vertex 2 are calculated by the CPU 101.

Using the values for the item attributes displayed in Table 3, the following system of linear equations with two variables and two equations is solved by CPU 101 to obtain the weights of potential points in this edge 1502:

$$w_a*0.75=w_b*0.6751$$

$$w_a+w_b=1$$

The solution to this system is $w_a=0.47$ and $w_b=0.53$. Because $w_a>0$ and $w_b>0$ then we store the following pairs of weights and items: $\{[(0.47, 0.53, 0), 2], [(0.47, 0.53, 0), 4]\}$ The edge points on the edge 1504 are calculated by the CPU 101 now. Using the values for the item attributes displayed in Table 3, the following system of linear equations with two variables and two equations is solved by CPU 101 to obtain the weights of potential points in this edge 1504:

$$w_a*0.75+w_c*0.9395=w_c$$

$$w_a+w_c=1$$

The solution to this system is $w_a=0.07$ and $w_c=0.93$. Because $w_a>0$ and $w_c>0$ then we store the following pairs of weights and items: $\{[(0.07, 0, 0.93), 2], [(0.07, 0, 0.93), 4]\}$ The edge points on the edge 1506 are calculated by the CPU 101 now. Using the values for the item attributes displayed in Table 3, the following system of linear equations with two variables and two equations is solved by CPU 101 to obtain the weights of potential points in this edge 1506:

$$w_c*0.9395=w_b*0.6751+w_c$$

$$w_b+w_c=1$$

The solution to this system is $w_b=-0.1$ and $w_c=1.1$. Because $w_b<0$ we discard this point.

The rest of the process for the rest of the pairs of items left is more schematically explained below.

For a sixth pair 6 comprising items 3 and 4, the process is as follows.

For the edge 1502 between vertex 1 and vertex 2, the following system of equations is solved:

$$w_a*0.5+w_b*0.4202=w_b*0.6751$$

$$w_a+w_b=1$$

The solution to this system is $w_a=0.34$ and $w_b=0.66$. Because $w_a>0$ and $w_b>0$ then we store the following pairs of weights and items: $\{[(0.34, 0.66, 0), 3], [(0.34, 0.66, 0), 4]\}$ For the edge 1504 between vertex 1 and vertex 3, the system of equations is:

$$w_a*0.5+w_c*0.9635=w_c$$

$$w_a+w_c=1$$

The solution to this system is $w_a=0.07$ and $w_c=0.93$. Because $w_a>0$ and $w_c>0$ then we store the following pairs of weights and items: $\{[(0.07, 0, 0.93), 3], [(0.07, 0, 0.93), 4]\}$ For edge 1506 between vertex 2 and vertex 3, the system of equations is:

$$w_b*0.4202+w_c*0.9635=w_b*0.6751+w_c$$

$$w_b+w_c=1$$

The solution to this system is $w_b=-0.17$ and $w_c=1.17$. Because $w_b<0$ we discard this point.

Finally, the possible internal points of the ternary plot will be calculated. We consider all distinct subsets of three items out of the four designs. There are 4 of such subsets.

For the first triplet 1, items 1, 2 and 3 are considered and the system of equations is:

$$w_a*a_1+w_b*b_1+w_c*c_1=w_a*a_2+w_b*b_2+w_c*c_2$$

$$w_a*a_1+w_b*b_1+w_c*c_1=w_a*a_3+w_b*b_3+w_c*c_3$$

$$w_a+w_b+w_c=1$$

Using the data from Table 3, this system becomes:

$$w_a+w_b=w_a*0.75+w_c*0.9395$$

$$w_a+w_b=w_a*0.5+w_b*0.4202+w_c*0.9635$$

$$w_a+w_b+w_c=1$$

The solution to this system is $w_a=0.42$, $w_b=0.23$ and $w_c=0.35$. Because all weights are positive, then we store the following pairs of weights and items: $\{[(0.42, 0.23, 0.35), 1], [(0.42, 0.23, 0.35), 2], [(0.42, 0.23, 0.35), 3]\}$.

For the second triplet 2 comprising items 1, 2 and 4, the system of equations is:

$$w_a*a_1+w_b*b_1+w_c*c_1=w_a*a_2+w_b*b_2+w_c*c_2$$

$$w_a*a_1+w_b*b_1+w_c*c_1=w_a*a_4+w_b*b_4+w_c*c_4$$

$$w_a+w_b+w_c=1$$

Using the data from Table 3, this system becomes:

$$w_a+=w_a*0.75+w_c*0.9395$$

$$w_a+w_b=w_b*0.6751+w_c$$

$$w_a+w_b+w_c=1$$

The solution to this system is $w_a=0.3$, $w_b=0.3$ and $w_c=0.4$. Because all weights are positive, then we store the following pairs of weights and items: $\{[(0.3, 0.3, 0.4), 1], [(0.3, 0.3, 0.4), 2], [(0.3, 0.3, 0.4), 4]\}$ For the third triplet 3 comprising items 1, 3 and 4, the system of equations is:

$$w_a*a_1+w_b*b_1+w_c*c_1=w_a*a_3+w_b*b_3+w_c*c_3$$

$$w_a*a_1+w_b*b_1+w_c*c_1=w_a*a_4+w_b*b_4+w_c*c_4$$

$$w_a+w_b+w_c=1$$

Using the data from Table 3, this system becomes:

$$w_a+w_b=w_a*0.5+w_b*0.4202+w_c*0.9635$$

$$w_a+w_b=w_b*0.6751+w_c$$

$$w_a+w_b+w_c=1$$

The solution to this system is $w_a=0.23$, $w_b=0.41$ and $w_c=0.36$. Because all weights are positive, then we store the following pairs of weights and items: $\{[(0.23, 0.41, 0.36), 1], [(0.23, 0.41, 0.36), 3], [(0.23, 0.41, 0.36), 4]\}$ For the fourth triplet 4 comprising items 2, 3 and 4, the system of equations is:

$$w_a*a_2+w_b*b_2+w_c*c_2=w_a*a_3+w_b*b_3+w_c*c_3$$

$$w_a*a_2+w_b*b_2+w_c*c_2=w_a*a_4+w_b*b_4+w_c*c_4$$

$$w_a+w_b+w_c=1$$

Using the data from Table 3, this system becomes:

$$w_a*0.75+w_c*0.9395=w_a*0.5+w_b*0.4202+w_c*0.9635$$

$$w_a*0.75+w_c*0.9395=w_b*0.6751+w_c$$

$$w_a+w_b+w_c=1$$

The solution to this system is $w_a=0.06$, $w_b=-0.02$ and $w_c=0.96$. Because $w_b<0$ we discard this point.

Table 4 shows the stored vertex, edge and internal points after these steps.

TABLE 4 obtained vertex, edge and internal points after Phase 1

|   | Type | Items | $w_a$ | $w_b$ | $w_c$ |
|---|---|---|---|---|---|
| 1 | Vertex | 1 | 1 | 0 | 0 |
| 2 | Vertex | 1 | 0 | 1 | 0 |
| 3 | Vertex | 4 | 0 | 0 | 1 |
| 4 | Edge | 1, 2 | 0.79 | 0 | 0.21 |
| 5 | Edge | 1, 2 | 0 | 0.48 | 0.52 |
| 6 | Edge | 1, 3 | 0 | 0.62 | 0.38 |
| 7 | Edge | 1, 4 | 0.5 | 0 | 0.5 |
| 8 | Edge | 1, 4 | 0 | 0.75 | 0.25 |
| 9 | Edge | 2, 3 | 0.63 | 0.37 | 0 |
| 10 | Edge | 2, 3 | 0.09 | 0 | 0.91 |
| 11 | Edge | 2, 4 | 0.47 | 0.53 | 0 |
| 12 | Edge | 2, 4 | 0.07 | 0 | 0.93 |
| 13 | Edge | 3, 4 | 0.34 | 0.66 | 0 |
| 14 | Edge | 3, 4 | 0.07 | 0 | 0.93 |
| 15 | Internal | 1, 2, 3 | 0.42 | 0.23 | 0.35 |
| 16 | Internal | 1, 2, 4 | 0.3 | 0.3 | 0.4 |
| 17 | Internal | 1, 3, 4 | 0.23 | 0.41 | 0.36 |

Now the edge and internal points will be checked. In this phase, we iterate through all the edge and internal points (points 4 to 17) and perform the following operations. For each point, which is determined by a set of weights, the score of all items is calculated. For each point, the items stored (two in the case of edges and three in the case of internal points) have the same score value (SCORE 1). Then, the maximum score value across all the items is obtained, which will be called SCORE MAX. If SCORE MAX>SCORE 1, then this point is discarded.

Table 5 shows the calculation of these scores. With a * we indicate the items that are stored with the corresponding points. In bold font we point out the cases where SCORE MAX>SCORE 1. The points that are not discarded are underlined.

From the edge and the internal points, the points numbers 4, 8, 19, 14, 15 and 17 are selected. The final list of points in Table 6 are displayed in FIG. 15A and are used to build the ternary plot displayed in FIG. 15B.

TABLE 6 final list of points

| point | type | items | $w_a$ | $w_b$ | $w_c$ |
|---|---|---|---|---|---|
| A | vertex | 1 | 1 | 0 | 0 |
| B | vertex | 1 | 0 | 1 | 0 |
| C | vertex | 4 | 0 | 0 | 1 |
| D | edge | 1, 2 | 0.79 | 0 | 0.21 |
| E | edge | 1, 4 | 0 | 0.75 | 0.25 |
| F | edge | 2, 3 | 0.09 | 0 | 0.91 |
| G | edge | 3, 4 | 0.07 | 0 | 0.93 |
| H | internal | 1, 2, 3 | 0.42 | 0.23 | 0.35 |
| I | internal | 1, 3, 4 | 0.23 | 0.41 | 0.36 |

Each item corresponds to an area in the ternary plot, which is defined as the convex hull of the weight coordinates of the point. The convex hull of a set of two-dimensional points is the smallest convex polygon containing all the points. Before calculating the convex hull, the weight coordinates (wa, wb, wc) have to be transformed to coordinates in a two-dimensional space, where the origin is located at the bottom left vertex. A set of coordinates is denoted as the tuple (x,y) and the components are calculated from the weight coordinates as follows:

$$x = w_b + 0.5 * w_c, \text{ and } y = \frac{\sqrt{3}}{2} * w_c.$$

TABLE 5 processed of the obtained points

|   | type | items | wa | wb | wc | score$_1$ | score$_2$ | score$_3$ | score$_4$ | SCORE 1 | SCORE MAX |
|---|---|---|---|---|---|---|---|---|---|---|---|
| 4 | edge | 1, 2 | 0.79 | 0 | 0.21 | 0.790* | 0.790* | 0.597 | 0.210 | 0.790 | 0.790 |
| 5 | edge | 1, 2 | 0 | 0.48 | 0.52 | 0.480* | 0.489* | 0.703 | 0.844 | 0.490 | 0.844 |
| 6 | edge | 1, 3 | 0 | 0.62 | 0.38 | 0.620* | 0.357 | 0.627* | 0.799 | 0.630 | 0.799 |
| 7 | edge | 1, 4 | 0.5 | 0 | 0.5 | 0.500* | 0.845 | 0.732 | 0.500* | 0.500 | 0.845 |
| 8 | edge | 1, 4 | 0 | 0.75 | 0.25 | 0.750* | 0.235 | 0.556 | 0.756* | 0.760 | 0.756 |
| 9 | edge | 2, 3 | 0.63 | 0.37 | 0 | 1.000 | 0.473* | 0.470* | 0.250 | 0.470 | 1.000 |
| 10 | edge | 2, 3 | 0.09 | 0 | 0.91 | 0.090 | 0.922* | 0.922* | 0.910 | 0.920 | 0.922 |
| 11 | edge | 2, 4 | 0.47 | 0.53 | 0 | 1.000 | 0.353* | 0.458 | 0.358* | 0.350 | 1.000 |
| 12 | edge | 2, 4 | 0.07 | 0 | 0.93 | 0.075 | 0.925* | 0.929 | 0.925* | 0.925 | 0.929 |
| 13 | edge | 3, 4 | 0.34 | 0.66 | 0 | 1.000 | 0.255 | 0.447* | 0.446* | 0.450 | 1.000 |
| 14 | edge | 3, 4 | 0.07 | 0 | 0.93 | 0.070 | 0.926 | 0.931* | 0.930* | 0.930 | 0.931 |
| 15 | internal | 1, 2, 3 | 0.42 | 0.23 | 0.35 | 0.650* | 0.644* | 0.644* | 0.505 | 0.640 | 0.650 |
| 16 | internal | 1, 2, 4 | 0.3 | 0.3 | 0.4 | 0.600* | 0.601* | 0.661 | 0.603* | 0.600 | 0.661 |
| 17 | internal | 1, 3, 4 | 0.23 | 0.41 | 0.36 | 0.640* | 0.511 | 0.634* | 0.637* | 0.640 | 0.640 |

The final list of points in two-dimensional coordinates becomes:

TABLE 7 final list of points in two-dimensional coordinates

| point | type | items | x | y |
|---|---|---|---|---|
| A | vertex | 1 | 0 | 0 |
| B | vertex | 1 | 1 | 0 |
| C | vertex | 4 | 0.5 | 0.866 |
| D | edge | 1, 2 | 0.105 | 0.182 |
| E | edge | 1, 4 | 0.875 | 0.217 |
| F | edge | 2, 3 | 0.455 | 0.788 |
| G | edge | 3, 4 | 0.465 | 0.805 |
| H | internal | 1, 2, 3 | 0.405 | 0.303 |
| I | internal | 1, 3, 4 | 0.59 | 0.312 |

The two-dimensional points associated with item 1 are (0,0), (1,0), (0.105,0.182), (0.875,0.217), (0.405,0.303) and (0.59, 0.312) (points A, B, D, E, H and I in FIGS. 15A-B). The two-dimensional points associated with item 2 are (0.105, 0.182), (0.455,0.788) and (0.405,0.303) (points D, F and H in FIGS. 15A-B). The two-dimensional points associated with item 3 are (0.455,0.788), (0.465,0.805), (0.405,0.303) and (0.59,0.312) (points F, G, H an d I in FIGS. 15A-B). The two-dimensional points associated with item 4 are (0.5, 0.866), (0.875,0.217), (0.465,0.805) and (0.59,0.312) (points C, E, G and I in FIGS. 15A-B). For each point, the convex hull of the associated two-dimensional points for each item is calculated. To this end, an algorithm such as Quickhull can be used (C. Bradford Barber, David P. Dobkin, and Hannu Huhdanpaa. 1996. The quickhull algorithm for convex hulls. ACM Trans. Math. Softw. 22, 4 (December 1996), 469-483, DOI: https://doi.org/10.1145/235815.235821. The convex hull for each item defines an area that is then displayed in the ternary plot. The obtained areas are displayed in FIG. 15B, where the corresponding item is depicted inside each one of the obtained four areas.

The ternary plot shown in FIG. 15B comprises a first area 1510, a second area 1512, a third area 1514, and a fourth area 1516. The first area 1510 corresponds to the item 1 (experimental design 60). The second area 1512 corresponds to item 2 (experimental design 2033). The third area 1514 corresponds to item 3 (experimental design 9226). And the fourth area corresponds to item 4 (experimental design 9227).

The first area 1510 at the bottom indicates that experimental design 60 performs the best in the number of runs (number of tests) and the $4^{th}$ order correlation. This is, experimental design 60 has the best value within the four designs for these two statistical quality characteristics. The fourth area 1516 is at the top of the ternary plot and this means that experimental design 9227 is the best in terms of the power to detect quadratic effects. The fact that the fourth area 1516 does not extend towards the vertex 1 (number of experimental tests or runs) indicates that the experimental design 9227 is substantially larger than the experimental design 60. The third area 1514 occupies a central position in the ternary plot. This means that, despite not being the best design for any of the selected statistical quality characteristics, performs overall good for all three of them. The ternary plot is a decision support tool as it allows quantification of the alternatives. For example, the surface of the areas can be calculated, using, for example, the Shoelace formula. In the example, area 1510 has a surface of 0.228, area 1512 has a surface of 0.07, area 1514 has a surface of 0.045 and area 1516 has a surface of 0.087. Area 1510 has the largest surface, which indicates that experimental design 60 is performing best for a largest variety of attribute weights. Besides the large surface, design 60 performs best for two out of the three criteria, and it contains the weights coordinates (1/3,1/3,1/3), which is the center of gravity of the triangle. All these facts indicate that design 60 is the most appropriate for the problem at hand. However, if all three criteria are equally important, then one may consider design 9226. The central location of area 1514 indicates that design 9226 performs well for all three criteria despite it is not the best for any of them.

Several examples of applications of the invention will be provided in the following. It is understood that these examples are non-limiting and other application of the invention are also possible wherein other industrial processes are optimized. Furthermore, other parameters may be taken into account for optimizing the different industrial processes according to the invention.

Example 1: Optimization of Potato Chips Ingredients and Production Process Parameters in the Food Industry The first example relates to a company that needs to optimizes the proportions of ingredients and other some process parameters when producing potato chips. This first example would be also applicable for any other production process wherein proportions of ingredients or other process production parameters need to be optimized. To optimize the production of potato chips, an experiment needs to be performed to determine the optimal proportions of ingredients such as rice flour, potato, corn flour, the optimal temperature of the process, and the optimal cooking time to reduce the fat content of their chips while minimizing the production cost.

To that end they need to perform an experiment and have several alternative experimental designs to choose from. The experimental designs are described by three numerical attributes or parameters: a first parameter is the number of tests, a second parameter is the amount of information, and a third parameter is the maximum statistical correlation between the different effects. It is understood that any other suitable number of parameters could be chosen and that any other suitable parameters could be selected.

According to the invention, an operating system in a computer performs the following operations. A weight is assigned to each one of the attributes or parameters that describe the set of available experimental designs. Each experimental design corresponds to an item, and each attribute of an experimental design is a parameter of the corresponding item. Then, for each pair of items, a set of weights is determined that produce the same score in both items and the set of weights is stored if they are strictly positive. Then, the items that perform the best for each one of the three parameters is determined. For that, it is determined, at the operating system, a first vertex item, a second vertex item and a third vertex item, wherein the each of the first, second and third vertex items is the item comprising the greatest value for the parameter p, the second vertex item is the item of the plurality of items comprising respectively the greatest value for the first, second and third parameters. Then, the method proceeds to determine, at the operating system, a plurality of points based on the stored set of weights and corresponding pair of items, the first vertex item, the second vertex item and the third vertex item. The result is a plurality of points that are displayed as a ternary plot on a display screen by determining a set of regions. The set of regions partitions completely the ternary plot. Each region is a polygon, whose vertices are contained in the plurality of points obtained. Each regions indicates one or more items that perform the best for any combination of weights contained in the region. Then, the area of each polygon is calculated as previously described, and the operating systems may make a suggestion to the user to select one of the items in the region with the largest area. The operating system them receives an input from the user to select a region (item) in the displayed plot and the experiment design associated with said item is performed. In this way, the invention provides items optimized in respect to the set of weights contained in each respective region of the map, received an input to select an item in the displayed plot, wherein each item of the plurality of items identifies an experimental design for performing an industrial process, and then the industrial process is performed based on the experimental design corresponding to the selected item. I.e., the selected item identifies the experimental design that will be used to execute an experiment that optimizes the industrial process to produce potato chips. The selected experimental design balances the quality in what respect the attributes or parameters considered, this is, the number of tests, the among of information and the maximum statistical correlation between the different effects.

After the execution of the selected experiment, the user may further analyze the experimental data to further optimize the ingredients and production process parameters to obtain the best recipe for his industrial process. This is, the specific proportions of ingredients and the values of the process parameters that will minimize both the fat content and the production costs. The invention allows selecting a good experimental design that optimizes the industrial process at a minimal cost.

Example 2: Optimization of the Pharmaceutical Excipients Used in Pill Production The second experiment relates to, for instance, a pharmaceutical company that has developed a new active ingredient to successfully treat certain disease. The challenge for the pharmaceutical company is now to find appropriate excipient proportions to define a pill formula which is both acceptable in terms of production costs and stability. The pill should fulfill strict requirements in terms of shelf life, solubility, and hardness. This example is not limiting in this regard and could be applied to the production of any other pharmaceutical product wherein any other kind of parameters of the production process needs to be optimized.

To plan the experiment that optimizes the production of the pill, the company has several alternative experimental designs to choose from. Each experimental design is described by three numerical attributes or parameters: the first parameter is the number of excipients combinations that are to be tested, the second parameter is the projection capacity, and the third parameter is the average unscaled prediction variance.

As said, according to the invention, an operating system in a computer will perform the following operations. A weight is assigned to each one of the attributes or parameters that describe the set of available experimental designs. Each experimental design corresponds to an item, and each attribute of an experimental design is a parameter of the corresponding item. Then, for each pair of items, a set of weights is determined that produce the same score in both items and the set of weights is stored if they are strictly positive. Then, the items that perform the best for each one of the three parameters is determined. For that, it is determined, at the operating system, a first vertex item, a second vertex item and a third vertex item, wherein the each of the first, second and third vertex items is the item comprising the greatest value for the parameter p, the second vertex item is the item of the plurality of items comprising respectively the greatest value for the first, second and third parameters. Then, the method proceeds to determine, at the operating system, a plurality of points based on the stored set of weights and corresponding pair of items, the first vertex item, the second vertex item and the third vertex item. The result is a plurality of points that are displayed as a ternary plot on a display screen by determining a set of regions. The set of regions partitions completely the ternary plot. Each region is a polygon, whose vertices are contained in the plurality of points obtained. Each regions indicates one or more items that perform the best for any combination of weights contained in the region. Then, the area of each polygon is calculated as previously described, and the operating systems may make a suggestion to the user to select one of the items in the region with the largest area. The operating system them receives an input from the user to select a region (item) in the displayed plot and the experiment design associated with said item is performed. In this way, the invention provides items optimized in respect to the set of weights contained in each respective region of the map, received an input to select an item in the displayed plot, wherein each item of the plurality of items identifies an experimental design for producing the pill, and then the industrial process is performed based on the experimental design corresponding to the selected item by producing the pill. I.e., the selected item identifies the experimental design that will be used to execute an experiment that optimizes the industrial process to produce pills based on the selected parameters.

The excipients combination of each one of the experiments tests is used to produce a pill. On each pill, the outcomes of interest, this is, the shelf life, solubility, and hardness, may be measured. The set of all excipients combinations values and the corresponding outcomes of interest values conform the experimental data. The experimental data is analyzed, and a model is fitted to the data which relates the excipient proportions and the outcomes. The model is then used to optimize the excipients proportions to produce a pill that will remain within specifications at the minimal cost.

Example 3: Optimization of a Polymerization Industrial Process

The third example relates to a chemical industry that produces polypropylene for the car industry and wants to reduce the process energy cost and increase the adhesion of their polymerization process. A good adhesion implies that the polypropylene can be easily painted.

In the polymerization process, there are 5 chemicals that influence the adhesion, together with the temperature and pressure of the process. Depending on the values of the 5 chemicals, and the temperature and pressure, the adhesion of the polypropylene and the energy cost of the process varies. The objective of the company is to run a more efficient process (lower energy cost) while assuring a high quality in terms of adhesion. To achieve this goal, the company must figure out the best values for the proportions for the 5 chemicals, and the best values for the temperature and pressure of the process. To find this, the company decides to execute an experiment. Due to the fact that the polymerization process is expensive, the experimental plan must have 20 tests or less.

To plan the experiment, the company gathers 30 experimental designs with a number of runs that range between 12 and 20. Each experimental design is described by the number of tests (the first parameter), and by two other attributes or parameters. These two extra attributes are the D-efficiency for a ME models (the second parameter), and the maximum fourth order correlation (the third parameter).

According to the invention, an operating system in a computer performs the following operations. A weight is assigned to each one of the attributes or parameters that describe the set of available experimental designs. Each experimental design corresponds to an item, and each attribute of an experimental design is a parameter of the corresponding item. Then, for each pair of items, a set of weights is determined that produce the same score in both items and the set of weights is stored if they are strictly positive. Then, the items that perform the best for each one of the three parameters is determined. For that, it is determined, at the operating system, a first vertex item, a second vertex item and a third vertex item, wherein the each of the first, second and third vertex items is the item comprising the greatest value for the parameter p, the second vertex item is the item of the plurality of items comprising respectively the greatest value for the first, second and third parameters. Then, the method proceeds to determine, at the operating system, a plurality of points based on the stored set of weights and corresponding pair of items, the first vertex item, the second vertex item and the third vertex item. The result is a plurality of points that are displayed as a ternary plot on a display screen by determining a set of regions. The set of regions partitions completely the ternary plot. Each region is a polygon, whose vertices are contained in the plurality of points obtained. Each regions indicates one or more items that perform the best for any combination of weights contained in the region. Then, the area of each polygon is calculated as previously described, and the operating systems may make a suggestion to the user to select one of the items in the region with the largest area. The operating system them receives an input from the user to select a region (item) in the displayed plot and the experiment design associated with said item is performed. In this way, the invention provides items optimized in respect to the set of weights contained in each respective region of the map, received an input to select an item in the displayed plot, wherein each item of the plurality of items identifies an experimental design for performing an industrial process, and then the industrial process is performed based on the experimental design corresponding to the selected item. I.e., the selected item identifies the experimental design that will be used to execute an experiment that optimizes the industrial process to a polymerization industrial process. The selected experimental design balances the quality in what respect the first, second and third parameters considered.

After the execution of the selected experiment, the user may further analyze the experimental data to further optimize the ingredients and production process parameters to obtain the best recipe for his industrial process. The invention allows selecting a good experimental design that optimizes the polymerization industrial process at a minimal cost.

The selected item identifies the experimental design that will be used in the polymerization process experiment. Each test of the experiment contains specific values for the chemicals, the temperature, and the pressure that should be used at each time. After each test, the adhesion of the resulting polypropylene and the energy consumption are measured. Once the experiment has been executed entirely, the data is analyzed and optimized to find the best values for the chemicals, the temperature, and the pressure. In this way, the a polymerization industrial process is optimized at a minimal cost.

Example 4: Optimization of a Cleaning Process at the Semiconductor Industry

A company in the silicon sector needs to fine tune their wafer cleaning process, so that the level of impurities is kept to a minimum. To clean a wafer, the company can use up to 5 different reactives, and the process can be done at a pressure contained in a range of possible pressures, and at a temperature contained in a range of possible temperatures. To optimize the number of reactives, the pressure, and the temperature, the company decides to plan an experiment. To this end, the company gathers 20 different experimental designs or items to improve the cleaning process of the wafer. The experimental design should run in less than a week, and optimize information about the influence of the 5 reactives, the pressure, and the temperature in the final level of impurities. The amount of information of each experimental design is quantified using two parameters or numerical attributes: the running time and influence of reactives as the first parameter, and the pressure and temperature in level of impurities as the second parameter. The invention allows to choose a suitable design for the experiment, perform the experiment and analyze and optimize the data thereby providing an improved cleaning process. For that, the invention is applied in the same way as explained for previous examples.

CLAUSES

1. A method of designing and executing experiments in an industrial process using a method of generating a visual representation of a plurality of items, the method comprising:
   (a) selecting, at an operating system (142), a pair of items m and n from a plurality of items, wherein each item of the plurality of items comprises a plurality of parameters, each parameter of the plurality of parameters representing a property of the plurality of items;
   (b) for the selected pair of items m and n, selecting, at the operating system (142), a pair of parameters p and q from the plurality of parameters, wherein $a_{mp}$ is the parameter p of the item m, $b_{mq}$ is the parameter q of the item m, $a_{np}$ is the parameter p of the item n, and $b_{nq}$ is the parameter q of the item n;
   (c) calculating (1002) at the operating system (142), a pair of weights $w_p$ and $w_q$ wherein $w_p$ is calculated based on $a_{mp}$, $b_{mq}$, $a_{np}$ and $b_{nq}$, and wherein $w_q$ is calculated based on $a_{mp}$, $b_{mq}$, $a_{np}$ and $b_{nq}$;
   (d) if $w_p > 0$ and $w_q > 0$, storing (1004), in a memory (154) by the operating system (142), the pair of weights $w_p$ and $w_q$ and the pair of items m and n;
   (e) determining (904), at the operating system (142), a first vertex item, a second vertex item and a third vertex item, wherein the first vertex item is the item of the plurality of items comprising the greatest value for the parameter p, the second vertex item is the item of the plurality of items comprising the greatest value for the parameter q, and the third vertex item is the item of the plurality of items comprising the greatest value for a parameter r from the plurality of parameters;
(f) generating (908) at the operating system (142), a plurality of points based on the stored pair of weights $w_p$ and $w_q$ and the pair of items m and n, the first vertex item, the second vertex item and the third vertex item;
(g) displaying, in a display screen by the operating system (142), the visual representation of the plurality of items by displaying a plot comprising a geometric shape and comprising the plurality of points;
(h) receiving an input, by the operating system (142), to select an item in the displayed plot, wherein each item of the plurality of items identifies an experimental design for performing an industrial process; and
(i) performing the industrial process based on the experimental design corresponding to the selected item.

2. The method according to clause 1, the method further comprising the steps of:
(I) selecting, at the operating system (142), a set of three items i, j and k from the plurality of items;
(II) for the selected set of three items i, j and k, selecting, at the operating system (142), a set of three parameters p, q and r from the plurality of parameters, wherein $a_{ip}$ is the parameter p of the item i, $b_{iq}$ is the parameter q of the item i, $c_{ir}$ is the parameter r of the item i, $a_{jp}$ is the parameter p of the item j, $b_{jq}$ is the parameter q of the item j, $c_{jr}$ is the parameter r of the item j, $a_{kp}$ is the parameter p of the item k, $b_{kq}$ is the parameter q of the item k, and $c_{kr}$ is the parameter r of the item k;
(III) calculating (1102), at the operating system (142), a set of three weights $w_p$, $w_q$ and $w_r$ wherein $w_p$ is calculated based on $a_{ip}$, $b_{iq}$, $c_{ir}$, $a_{jp}$, $b_{jq}$, $c_{jr}$, $a_{kp}$, $b_{kq}$, and $c_{kr}$, $w_q$ is calculated based on $a_{ip}$, $b_{iq}$, $c_{ir}$, $a_{jp}$, $b_{jq}$, $c_{jr}$, $a_{kp}$, $b_{kq}$, and $c_{kr}$ and $w_r$ is calculated based on $a_{ip}$, $b_{iq}$, $c_{ir}$, $a_{jp}$, $b_{jq}$, $c_{jr}$, $a_{kp}$, $b_{kq}$, and $c_{kr}$; and
(IV) if $w_p>0$, $w_q>0$ and $w_r>0$, storing (1104), in the memory (154) by the operating system (142), the set of three weight values $w_p$, $w_q$ and $w_r$ and the set of three items i, j and k;
wherein step (f) further comprises generating the plurality of points based on the stored set of three weight values $w_p$, $w_q$ and $w_r$ and the set of three items i, j and k.

3. The method according to clause 1 further comprising repeating steps (a) through (d) for each pair of items m and n from the plurality of items.

4. The method according to any of clauses 1 and 3 further comprising repeating steps (b) through (d) for each pair of parameters p and q from the plurality of parameters.

5. The method according to clause 2 further comprising repeating the steps (I) through (IV) for each set of three items i, j and k from the plurality of items.

6. The method according to any of clauses 2, 4 and 5 further comprising repeating steps (II) through (IV) for each set of three parameters p, q and r from the plurality of parameters.

7. The method according to any of clauses 1, 3 and 4 wherein the pair of weights $w_p$ and $w_q$ in step (c) is calculated such that:

$$(w_p*a_{mp})+(w_q*b_{mq})=(w_p*a_{np})+(w_q*b_{nq}), \text{ and}$$

$$w_p+w_q=1.$$

8. The method according to any of clauses 2, 5 and 6 wherein the set of three weights $w_p$ $w_q$ and $w_r$ in step (III) is calculated such that:

$$(w_p*a_{ip})+(w_q*b_{iq})+(w_r*c_{ir})=(w_p*a_{jp})+(w_q*b_{jq})+(w_r*c_{jr}),$$

$$(w_p*a_{ip})+(w_q*b_{iq})+(w_r*c_{ir})=(w_p*a_{kp})+(w_q*b_{kq})+(w_r*c_{kr}), \text{ and}$$

$$w_p+w_q+w_r=1.$$

9. The method according to any of clauses 1, 3, 4 and 7 wherein generating the plurality of points in step (f) further comprises:
calculating, at the operating system (142), a score value of the stored pair of weight values $w_p$ and $w_q$ and the pair of items m and n, wherein said score value is calculated as a linear combination of $w_p$ and $w_q$ and the plurality of parameters of one of the pair of items m and n; and
determining whether to discard the stored set pair of weight values $w_p$, and $w_q$ and the pair of items m and n based on the calculated score value;
or
the method according to any of claims 2, 5, 6 and 8 wherein generating the plurality of points in step (f) further comprises:
calculating, at the operating system (142), a score value of the stored set of three weight values $w_p$, $w_q$ and $w_r$ and the set of three items i, j and k, wherein said score value is calculated as a linear combination of $w_p$, $w_q$ and $w_r$ and the plurality of parameters of one of the three items i, j and k; and
determining whether to discard the stored set of three weight values $w_p$, $w_q$ and $w_r$ and the set of three items i, j and k based on the calculated score value.

10. The method according to clause 9 wherein:
determining whether to discard the stored set pair of weight values $w_p$, and $w_q$ and the pair of items m and n further comprises:
calculating, at the operating system (142), another score value for each item of the plurality of items as a linear combination of the stored pair of weight values $w_p$, and $w_q$ and the plurality of parameters of one of the pair of items m and n;
obtaining, at the operating system (142), a comparison value based on the score value and another score value; and
determining whether to discard the stored set pair of weight values $w_p$, and $w_q$ and the pair of items m and n based on the comparison value;
or
wherein determining whether to discard the stored set of three weight values $w_p$, $w_q$ and $w_r$ and the set of three items i, j and k further comprises:
calculating, at the operating system (142), another score value for each item of the plurality of items as a linear combination of the stored set of three weight values $w_p$, $w_q$ and $w_r$ and the plurality of parameters of one of the three items i, j and k;
obtaining, at the operating system (142), a comparison value based on the score value and the another score value; and
determining whether to discard the stored set of three weight values $w_p$, $w_q$ and $w_r$ and the set of three items i, j and k based on the comparison value.

11. The method according to clause 1 wherein each parameter of the plurality of parameters further comprises a direction value and wherein the method further comprises performing, at the operating system (142), a transformation of at least one parameter of at least one item of the plurality of items based on the direction of at least one parameter.

12. The method according to clause 11, wherein performing the transformation comprises performing a sign change operation of at least one parameter of at least one item.

13. The method according to clause 11, wherein the direction value of a parameter indicates one of two directions of improvement for said parameter and wherein performing the transformation of at least one parameter based on the direction comprises performing the transformation if the direction value indicates a determined direction of improvement.

14. The method according to any of the previous clauses, wherein the plot is a ternary plot.

15. The method according to any of the previous clauses, wherein the industrial process comprises producing a product.

The invention claimed is:

1. A computer-implemented method of generating a visual representation of items, the method comprising:
 (a) selecting, at an operating system, a pair of items m and n from a plurality of items, wherein each item of the plurality of items comprises a plurality of parameters, each parameter of the plurality of parameters representing a property of the plurality of items;
 (b) for the selected pair of items m and n, selecting, at the operating system, a pair of parameters p and q from the plurality of parameters, wherein $a_{mp}$ is the parameter p of the item m, $b_{mq}$ is the parameter q of the item m, $a_{np}$ is the parameter p of the item n, and $b_{nq}$ is the parameter q of the item n;
 (c) calculating, at the operating system, a pair of weights $w_p$ and $w_q$ wherein $w_p$ is calculated based on $a_{mp}$, $b_{mq}$, $a_{np}$ and $b_{nq}$, and wherein $w_q$ is calculated based on $a_{mp}$, $b_{mq}$, $a_{np}$ and $b_{nq}$;
 (d) if $w_p > 0$ and $w_q > 0$, storing, in a memory by the operating system, the pair of weights $w_p$ and $w_q$ and the pair of items m and n;
 (e) determining, at the operating system, a first vertex item, a second vertex item and a third vertex item, wherein the first vertex item is the item of the plurality of items comprising the greatest value for the parameter p, the second vertex item is the item of the plurality of items comprising the greatest value for the parameter q, and the third vertex item is the item of the plurality of items comprising the greatest value for a parameter r from the plurality of parameters;
 (f) generating, at the operating system, a plurality of points based on the stored pair of weights $w_p$ and $w_q$ and the pair of items m and n, the first vertex item, the second vertex item and the third vertex item; and
 (g) displaying, in a display screen by the operating system, the visual representation of the plurality of items by displaying a plot comprising a geometric shape and comprising the plurality of points.

2. The computer-implemented method according to claim 1, the method further comprising the steps of:
 (I) selecting, at the operating system, a set of three items i, j and k from the plurality of items;
 (II) for the selected set of three items i, j and k, selecting, at the operating system, a set of three parameters p, q and r from the plurality of parameters, wherein $a_{ip}$ is the parameter p of the item i, $b_{iq}$ is the parameter q of the item i, $c_{ir}$ is the parameter r of the item i, $a_{jp}$ is the parameter p of the item j, $b_{jq}$ is the parameter q of the item j, $c_{jr}$ is the parameter r of the item j, $a_{kp}$ is the parameter p of the item k, $b_{kq}$ is the parameter q of the item k, and $c_{kr}$ is the parameter r of the item k;
 (III) calculating, at the operating system, a set of three weights $w_p$, $w_q$ and $w_r$ wherein $w_p$ is calculated based on $a_{ip}$, $b_{iq}$, $a_{jp}$, $b_{jq}$, $c_{jr}$, $a_{kp}$, $b_{kq}$, and $c_{kr}$, $w_q$ is calculated based on $a_{ip}$, $b_{iq}$, $a_{jp}$, $b_{jq}$, $c_{jr}$, $a_{kp}$, $b_{kq}$, and $c_{kr}$ and $w_r$ is calculated based on $a_{ip}$, $a_{jp}$, $b_{jq}$, $c_{jr}$, $a_{kp}$, $b_{kq}$, and $c_{kr}$; and
 (IV) if $w_p > 0$, $w_q > 0$ and $w_r > 0$, storing, in the memory by the operating system, the set of three weight values $w_p$, $w_q$ and $w_r$ and the set of three items i, j and k;
wherein step (f) further comprises generating the plurality of points based on the stored set of three weight values $w_p$, $w_q$ and $w_r$ and the set of three items i, j and k.

3. The computer-implemented method according to claim 1 further comprising repeating steps (a) through (d) for each pair of items m and n from the plurality of items.

4. The computer-implemented method according to claim 1 further comprising repeating steps (b) through (d) for each pair of parameters p and q from the plurality of parameters.

5. The computer-implemented method according to claim 2 further comprising repeating the steps (I) through (IV) for each set of three items i, j and k from the plurality of items.

6. The computer-implemented method according to claim 2 further comprising repeating steps (II) through (IV) for each set of three parameters p, q and r from the plurality of parameters.

7. The computer-implemented method according to claim 1 wherein the pair of weights $w_p$ and $w_q$ in step (c) is calculated such that:

$$(w_p * a_{mp}) + (w_q * b_{mq}) = (w_p * a_{np}) + (w_q * b_{nq}), \text{ and}$$

$$w_p + w_q = 1.$$

8. The computer-implemented method according to claim 2 wherein the set of three weights $w_p$, $w_q$ and $w_r$ in step (III) is calculated such that:

$$(w_p * a_{ip}) + (w_q * b_{iq}) + (w_r * c_{ir}) = (w_p * a_{jp}) + (w_q * b_{jq}) + (w_r * c_{jr}),$$

$$(w_p * a_{ip}) + (w_q * b_{iq}) + (w_r * c_{ir}) = (w_p * a_{kp}) + (w_q * b_{kq}) + (w_r * c_{kr}), \text{ and}$$

$$w_p + w_q + w_r = 1.$$

9. The computer-implemented method according to claim 1 wherein generating the plurality of points in step (f) further comprises:
 calculating, at the operating system, a score value of the stored pair of weight values $w_p$ and $w_q$ and the pair of items m and n, wherein said score value is calculated as a linear combination of $w_p$, and $w_q$ and the plurality of parameters of one of the pair of items m and n; and
 determining whether to discard the stored set pair of weight values $w_p$, and $w_q$ and the pair of items m and n based on the calculated score value;
or
the computer-implemented method according to claim 2 wherein generating the plurality of points in step (f) further comprises:
 calculating, at the operating system, a score value of the stored set of three weight values $w_p$, $w_q$ and $w_r$ and the set of three items i, j and k, wherein said score value is calculated as a linear combination of $w_p$, $w_q$ and $w_r$ and the plurality of parameters of one of the three items i, j and k; and determining whether to discard the stored set of three weight values $w_p$, $w_q$ and $w_r$ and the set of three items i, j and k based on the calculated score value.

10. The computer-implemented method according to claim 9 wherein:
determining whether to discard the stored set pair of weight values $w_p$, and $w_q$ and the pair of items m and n further comprises:
calculating, at the operating system, another score value for each item of the plurality of items as a linear combination of the stored pair of weight values $w_p$, and $w_q$ and the plurality of parameters of one of the pair of items m and n;
obtaining, at the operating system, a comparison value based on the score value and the another score value; and
determining whether to discard the stored set pair of weight values $w_p$, and $w_q$ and the pair of items m and n based on the comparison value;
or
wherein determining whether to discard the stored set of three weight values $w_p$, $w_q$ and $w_r$ and the set of three items i, j and k further comprises:
calculating, at the operating system, another score value for each item of the plurality of items as a linear combination of the stored set of three weight values $w_p$, $w_q$ and $w_r$ and the plurality of parameters of one of the three items i, j and k;
obtaining, at the operating system, a comparison value based on the score value and the another score value; and
determining whether to discard the stored set of three weight values $w_p$, $w_q$ and $w_r$ and the set of three items i, j and k based on the comparison value.

11. The computer-implemented method according to claim 1 wherein each parameter of the plurality of parameters further comprises a direction value and wherein the method further comprises performing, at the operating system, a transformation of at least one parameter of at least one item of the plurality of items based on the direction of the at least one parameter.

12. The computer-implemented method according to claim 11, wherein performing the transformation comprises performing a sign change operation of the at least one parameter of the at least one item.

13. The computer-implemented method according to claim 11, wherein the direction value of a parameter indicates one of two directions of improvement for said parameter and wherein performing the transformation of the at least one parameter based on the direction comprises performing the transformation if the direction value indicates a determined direction of improvement.

14. The computer-implemented method according to claim 1, wherein the plot is a ternary plot and each item of the plurality of items identifies an experimental model.

15. The computer-implemented method according to claim 14, further comprising receiving an input, by the operating system, to select an item in the displayed ternary plot.

16. A computer device for generating a visual representation of items, the computer device comprising a display, one or more processors, memory and one or more programs stored in the memory and configured for execution of the one or more processors, the one or more programs comprising instructions for:
(a) Selecting a pair of items m and n from a plurality of items, wherein each item of the plurality of items comprises a plurality of parameters, each parameter of the plurality of parameters representing a property of the plurality of items;
(b) for the selected pair of items m and n, selecting a pair of parameters p and q from the plurality of parameters, wherein $a_{mp}$ is the parameter p of the item m, $b_{mq}$ is the parameter q of the item m, $a_{np}$ is the parameter p of the item n, and $b_{nq}$ is the parameter q of the item n;
(c) calculating a pair of weights $w_p$ and $w_q$ wherein $w_p$ is calculated based on $a_{mp}$, $b_{mq}$, $a_{np}$ and $b_{nq}$, and wherein $w_q$ is calculated based on $a_{mp}$, $b_{mq}$, $a_{np}$ and $b_{nq}$;
(d) if $w_p>0$ and $w_q>0$, storing, in the memory, the pair of weights $w_p$ and $w_q$ and the pair of items m and n;
(e) determining a first vertex item, a second vertex item and a third vertex item, wherein the first vertex item is the item of the plurality of items comprising the greatest value for the parameter p, the second vertex item is the item of the plurality of items comprising the greatest value for the parameter q, and the third vertex item is the item of the plurality of items comprising the greatest value for a parameter r from the plurality of parameters;
(f) generating a plurality of points based on the stored pair of weights $w_p$ and $w_q$ and the pair of items m and n, the first vertex item, the second vertex item and the third vertex item; and
(g) displaying, in the display, the visual representation of the plurality of items by displaying a plot comprising a geometric shape and comprising the plurality of points.

17. The computer device according to claim 16, the one or more programs further comprising instructions for:
(I) Selecting a set of three items i, j and k from the plurality of items;
(II) for the selected set of three items i, j and k, selecting a set of three parameters p, q and r from the plurality of parameters, wherein $a_{ip}$ is the parameter p of the item i, $b_{iq}$ is the parameter q of the item i, $c_{ir}$ is the parameter r of the item i, $a_{jp}$ is the parameter p of the item j, $b_{jq}$ is the parameter q of the item j, $c_{jr}$ is the parameter r of the item j, $a_{kp}$ is the parameter p of the item k, $b_{kq}$ is the parameter q of the item k, and $c_{kr}$ is the parameter r of the item k;
(III) calculating a set of three weights $w_p$, $w_q$ and $w_r$ wherein $w_p$ is calculated based on $a_{jp}$, $b_{jq}$, $c_{jr}$, $a_{kp}$, $b_{kq}$, and $c_{kr}$, $w_q$ is calculated based on $a_{ip}$, $b_{iq}$, $c_{ir}$, $a_{jp}$, $b_{jq}$, $c_{jr}$, $a_{kp}$, $b_{kq}$, and $c_{kr}$ and $w_r$ is calculated based on $a_{ip}$, $b_{iq}$, $c_{ir}$, $a_{jp}$, $b_{jq}$, $c_{jr}$, $a_{kp}$, $b_{kq}$, and $c_{kr}$; and
(IV) if $w_p>0$, $w_q>0$ and $w_r>0$, storing, in the memory, the set of three weight values $w_p$, $w_q$ and $w_r$ and the set of three items i, j and k;
wherein step (f) further comprises generating the plurality of points based on the stored set of three weight values $w_p$, $w_q$ and $w_r$ and the set of three items i, j and k.

18. The computer device according to claim 16, the one or more programs further comprising instructions for generating the plurality of points in (f) by:
Calculating a score value of the stored pair of weight values $w_p$ and $w_q$ and the pair of items m and n, wherein said score value is calculated as a linear combination of $w_p$, and $w_q$ and the plurality of parameters of one of the pair of items m and n; and
determining whether to discard the stored set pair of weight values $w_p$, and $w_q$ and the pair of items m and n based on the calculated score value.

19. The computer device according to claim 18, the one or more programs further comprising instructions for determining whether to discard the stored set pair of weight values $w_p$, and $w_q$ and the pair of items m and n by:
    Calculating another score value for each item of the plurality of items as a linear combination of the stored pair of weight values $w_p$, and $w_q$ and the plurality of parameters of one of the pair of items m and n;
    Obtaining a comparison value based on the score value and the another score value; and
    determining whether to discard the stored set pair of weight values $w_p$, and $w_q$ and the pair of items m and n based on the comparison value;

or the one or more programs further comprising instructions for determining whether to discard the stored set of three weight values $w_p$, $w_q$ and $w_r$ and the set of three items i, j and k by:
    calculating another score value for each item of the plurality of items as a linear combination of the stored set of three weight values $w_p$, $w_q$ and $w_r$ and the plurality of parameters of one of the three items i, j and k;
    obtaining a comparison value based on the score value and the another score value; and
    determining whether to discard the stored set of three weight values $w_p$, $w_q$ and $w_r$ and the set of three items i, j and k based on the comparison value.

20. A non-transitory computer-readable storage medium storing one or more programs configured for execution by a computer system having a display, one or more processors, and memory, the one or more programs comprising instructions for:
(a) Selecting a pair of items m and n from a plurality of items, wherein each item of the plurality of items comprises a plurality of parameters, each parameter of the plurality of parameters representing a property of the plurality of items;
(b) for the selected pair of items m and n, selecting a pair of parameters p and q from the plurality of parameters, wherein $a_{mp}$ is the parameter p of the item m, $b_{mq}$ is the parameter q of the item m, $a_{np}$ is the parameter p of the item n, and $b_{nq}$ is the parameter q of the item n;
(c) calculating a pair of weights $w_p$ and $w_q$ wherein $w_p$ is calculated based on $a_{mp}$, $b_{mq}$, $a_{np}$ and $b_{nq}$, and wherein $w_q$ is calculated based on $a_{mp}$, $b_{mq}$, $a_{np}$ and $b_{nq}$;
(d) if $w_p>0$ and $w_q>0$, storing, in the memory, the pair of weights $w_p$ and $w_q$ and the pair of items m and n;
(e) determining a first vertex item, a second vertex item and a third vertex item, wherein the first vertex item is the item of the plurality of items comprising the greatest value for the parameter p, the second vertex item is the item of the plurality of items comprising the greatest value for the parameter q, and the third vertex item is the item of the plurality of items comprising the greatest value for a parameter r from the plurality of parameters;
(f) generating a plurality of points based on the stored pair of weights $w_p$ and $w_q$ and the pair of items m and n, the first vertex item, the second vertex item and the third vertex item; and
(g) displaying, in the display, the visual representation of the plurality of items by displaying a plot comprising a geometric shape and comprising the plurality of points.

* * * * *